(12) United States Patent  
Olsson et al.

(10) Patent No.: US 9,411,067 B2  
(45) Date of Patent: Aug. 9, 2016

(54) GROUND-TRACKING SYSTEMS AND APPARATUS

(71) Applicants: Mark S. Olsson, La Jolla, CA (US); Ray Merewether, La Jolla, CA (US); Sequoyah Aldridge, San Diego, CA (US); Ryan B. Levin, San Diego, CA (US)

(72) Inventors: Mark S. Olsson, La Jolla, CA (US); Ray Merewether, La Jolla, CA (US); Sequoyah Aldridge, San Diego, CA (US); Ryan B. Levin, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 195 days.

(21) Appl. No.: 13/841,879

(22) Filed: Mar. 15, 2013

(65) Prior Publication Data

US 2014/0111208 A1    Apr. 24, 2014

Related U.S. Application Data

(60) Provisional application No. 61/615,810, filed on Mar. 26, 2012, provisional application No. 61/781,889, filed on Mar. 14, 2013, provisional application No. 61/783,011, filed on Mar. 14, 2013, provisional application No. 61/786,385, filed on Mar. 15, 2013, provisional application No. 61/784,854, filed on Mar. 14, 2013, provisional application No. 61/786,350, filed on Mar. 15, 2013, provisional application No. 61/779,830, filed on Mar. 13, 2013.

(51) Int. Cl.  
*G01V 3/12* (2006.01)  
*G01V 3/10* (2006.01)  
*G01V 3/15* (2006.01)

(52) U.S. Cl.  
CPC .. *G01V 3/12* (2013.01); *G01V 3/10* (2013.01); *G01V 3/15* (2013.01)

(58) Field of Classification Search  
CPC ............. G01V 3/10; G01V 3/12; G01V 3/15; B63C 2009/0017; G01S 1/024; G01S 19/00; G01S 19/01; G01S 19/11; G01S 19/38; G01S 19/39  
USPC .............. 324/67, 326–329; 702/15, 190, 191; 342/22, 459  
See application file for complete search history.

(56) References Cited

U.S. PATENT DOCUMENTS

| | | | |
|---|---|---|---|
| 2003/0122353 A1* | 7/2003 | Liao | 280/651 |
| 2006/0196258 A1* | 9/2006 | Watabe et al. | 73/146 |
| 2011/0006772 A1* | 1/2011 | Olsson et al. | 324/326 |

* cited by examiner

*Primary Examiner* — Son Le  
(74) *Attorney, Agent, or Firm* — Steven C. Tietsworth

(57) ABSTRACT

A ground tracking system including a ground follower assembly for use with a locator or other device for determining position, motion, and/or orientation information is disclosed. The ground follower assembly may include a wheel assembly coupled to a locator and configured to swivel and/or pivot relative to an antenna node of the locator to generate signals for use in determining position information during a locate operation, such as from a sonde array.

11 Claims, 39 Drawing Sheets

GROUND-TRACKING SYSTEMS AND APPARATUS

CROSS-REFERENCE TO RELATED APPLICATIONS

This application claims priority under 35 U.S.C. §119(e) to U.S. Provisional Patent Application Ser. No. 61/615,810, filed Mar. 26, 2012, entitled GROUND-TRACKING SYSTEMS AND APPARATUS, to U.S. Provisional Patent Application Ser. No. 61/781,889, filed Mar. 14, 2013, entitled OMNI-INDUCER TRANSMITTING DEVICES AND METHODS, to U.S. Provisional Patent Application Ser. No. 61/783,011, filed Mar. 14, 2013, entitled MULTI-FREQUENCY LOCATING SYSTEMS AND METHODS, to U.S. Provisional Patent Application Ser. No. 61/786,385, entitled DUAL ANTENNA SYSTEMS WITH VARIABLE POLARIZATION, filed Mar. 15, 2013, to U.S. Provisional Patent Application Ser. No. 61/784,854, filed Mar. 14, 2013, entitled SELF-GROUNDING TRANSMITTING PORTABLE CAMERA CONTROLLER FOR USE WITH PIPE INSPECTION SYSTEM, to U.S. Provisional Patent Application Ser. No. 61/786,350, filed Mar. 15, 2013, entitled USER INTERFACES FOR UTILITY LOCATORS, and to U.S. Provisional Patent Application Ser. No. 61/779,830, filed Mar. 13, 2013, entitled GRADIENT ANTENNA COILS AND ARRAYS FOR USE IN LOCATING SYSTEMS. The content of each of these applications is incorporated by reference herein in its entirety for all purposes.

FIELD

This disclosure relates generally to ground tracking systems and apparatus for use with buried object locators. More specifically, but not exclusively, this disclosure relates to a ground tracking system for providing signals associated with position and/or motion information of a coupled buried object locator, relative to the surface of the ground.

BACKGROUND

There are many situations where it is desirable to locate buried utilities or other objects, such as pipes and cables. For example, prior to starting any new construction that involves excavation, it is important to locate buried objects and underground utilities, such as power lines, gas lines, phone lines, fiber optic cable conduits, cable television (CATV) cables, sprinkler control wiring, water pipes, sewer pipes, and the like (collectively and individually referred to herein as "utilities" or "objects"). As used herein, the term "buried" refers not only to objects below the surface of the ground, but also to objects located inside walls, between floors in multi-story buildings, cast into concrete slabs, or otherwise obscured, covered, or hidden from direct view or access.

Location of these buried objects may be important for cost, time, and safety reasons. For example, if a backhoe or other excavation equipment hits a high voltage line or a gas line, serious injury may result. Further, severing water mains and sewer lines leads to messy cleanups.

Buried objects can be located by sensing an emitted electromagnetic signal. For example, some buried cables, such as electric power lines, are already energized and emit their own long cylindrical electromagnetic field. In other cases, the buried object may be energized to produce electromagnetic radiation. For example, an external electrical power source having, for example, a frequency in a range of approximately 22 Hz to 500 kHz may be used to energize a buried object such as a pipe or conduit. Location of buried long conductors is often referred to as "line tracing," and the results may be referred to as a "locate."

SUMMARY

The present disclosure relates generally to systems, methods, and apparatus for locating buried objects (locators). More specifically, but not exclusively, the disclosure relates to ground tracking device configured for use with locators or other measurement devices to follow a ground or other surface and provide signals associated with position and/or motion information in one or more axes of motion that may be used by the locator to generate position, motion, and/or orientation information.

Various additional aspects, features, functions, and details are further described below in conjunction with the appended Drawings.

DETAILED DESCRIPTION OF EMBODIMENTS

Overview

Figure 1:
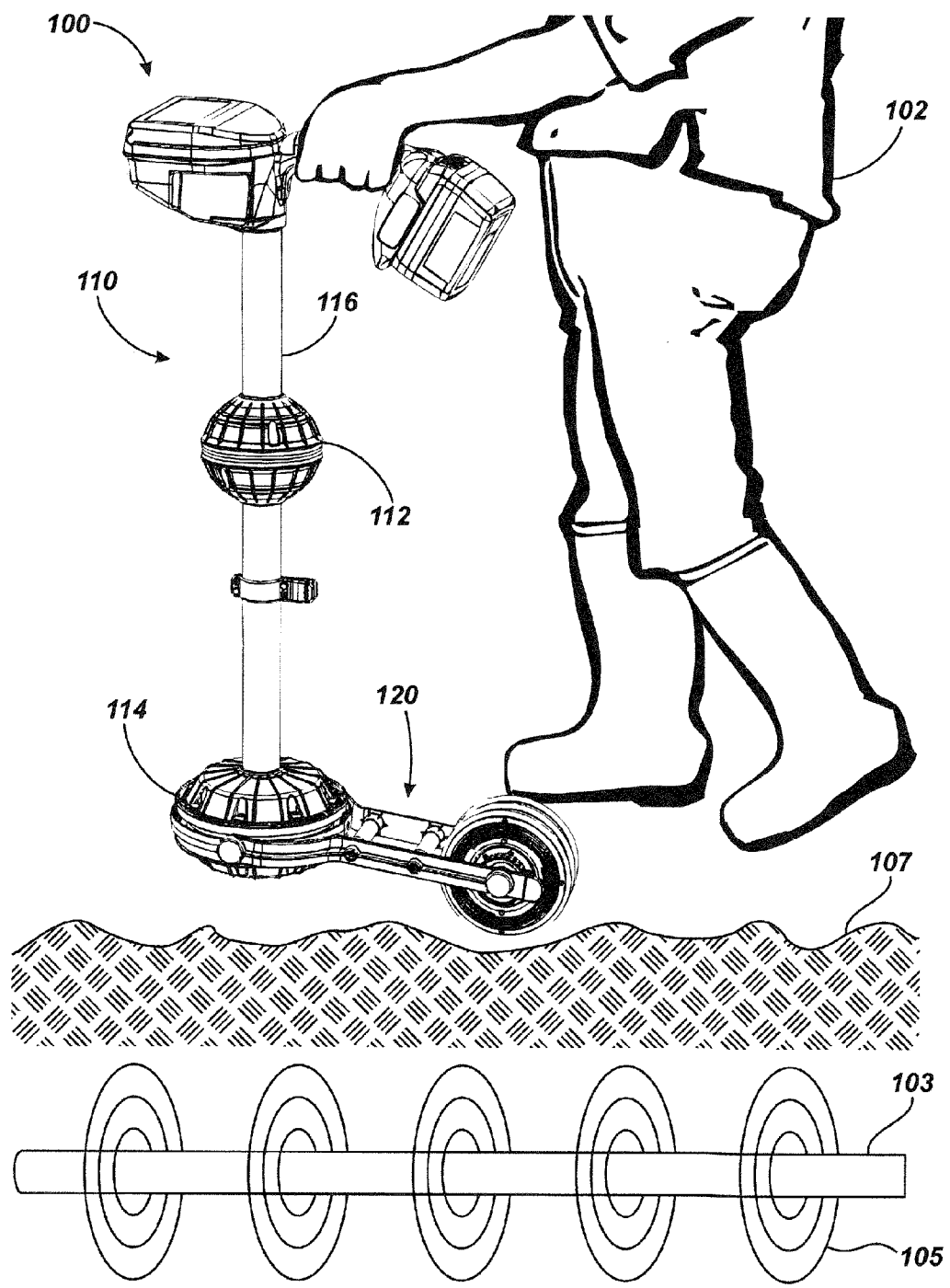
FIG. 1 illustrates details of an embodiment of a ground tracking system in use in accordance with aspects of the present disclosure.

The present disclosure relates generally to systems, methods, and apparatus for locating buried objects. More specifically, but not exclusively, the disclosure relates to a ground tracking device configured with a locator to follow the ground or other surface, and provide position and/or motion information, including measurements regarding changes in heading of the ground tracking device (e.g., translational and rotational movement with respect to the ground/other surface).

In accordance with one aspect of the invention, the ground tracking device may include at least one measurement device for sensing motion and position in x, y and z dimensions in addition to a time dimension. The measurement device may sense a rotational motion of a ground tracking device (or any part of the ground tracking device) about a substantially fixed ground reference point, and one or more output signals may include one or more signals corresponding to the rotational motion about the substantially fixed ground point. The measurement device may also/alternatively sense a translational motion of the ground tracking device, or a part thereof, over the ground/surface, and the one or more signals may include one or more signals corresponding to the translational motion. The measurement device may also/alternatively sense an up and/or down motion of the ground tracking device, or a part thereof, relative to the ground/surface, and the one or more signals may include one or more signals corresponding to the up and/or down motion. Alternately, or in addition, the measurement device may sense a swivel motion of the ground tracking device, or a part thereof, with respect to the ground/surface or another part of the ground tracking device, and the one or more signals may include one or more signals corresponding to the swivel motion. The measurement device may sense, for example, vertical, horizontal or other movement and/or orientation of a floating wheel with respect to another wheel (e.g., the center wheel), and the one or more signals may include one or more signals corresponding to the relative movement and/or orientation of the floating wheel.

In accordance with another aspect, the ground tracking device may include a ground follower assembly coupled to an antenna node. The ground follower assembly may be configured to generate one or more output signals corresponding to motion or distance of the locator device over a ground or surface. The ground follower assembly may further include a wheel assembly coupled to an antenna node of a locator with a coupling element, such as a yoke element, which may be removably attached to a race ring assembly mounted on the antenna node. For example, the yoke may be coupled to a pair of hinges disposed on the race ring assembly.

In accordance with one aspect, the disclosure relates to a wheel assembly which may include one or more wheels which maintain contact with the ground simultaneously. The wheel assembly may include, for example, a left floating wheel, a right floating wheel, and a center wheel. Each wheel may turn in a forward or backward direction In accordance with another aspect, the wheel assembly and/or other components of the ground tracking device may include various sensors for collecting movement and position information. Examples of sensors include one or more compasses, accelerometers, magnets, GPS receivers, gyroscopes, barometers, magnetic field, and other sensors. Any number of these sensors may be used to collect information regarding movement or position of each individual wheel and/or the relative movement or position of two or more wheels (e.g., the left and right floating wheels) with respect to each other or another wheel (e.g., the center wheel). For example, relative turning of the left and right floating wheels may be measured with respect to the center wheel, and different outputs may be determined depending on the direction of the respective turning, and also distance traveled by each wheel over a period of time. When the wheel assembly travels over a surface along an arc (e.g., a clockwise arc pathway), for instance, the outside wheel (e.g., the left floating wheel) normally must turn more than the inside wheel (e.g., the right floating wheel) because it travels a greater distance during the same amount of time. The traveled pathway may be determined, for example, by considering both the difference between the distances travel by each wheel and the fixed distance separating the wheels. When the wheel assembly rotates/pivots about a point on a surface below the center of the wheel assembly (e.g., in a clockwise direction), for instance, the outside wheels normally must turn in opposite directions while the center wheel does not turn. The amount of rotation may be determined, for example, by considering the amount of turning by each wheel and the circumference of each wheel. Knowing the relative translational and rotational movement provides information that may be used to track the relative direction or and distance traveled by the ground tracking device.

Tracked movement and position of the wheel assembly may be used to track movement and position of an antenna node in a locator assembly connected to the wheel assembly.

For example, the locator assembly and wheel assembly may be connected to each other via a coupling element having a fixed length. Vertical and horizontal differences between the position of the wheel assembly and the locator assembly may be determined and used in association with calculated position and motion of the wheel assembly to ascertain the position and motion of the antenna node. For example, the measured angle of magnetic field lines generated by an inductor disposed in the wheel assembly may provide a relative angle of the wheel assembly to the locator. In some embodiments, such an inductor may include a magnetic dipole beacon such as a sonde. Hereafter, the terms "inductor", "magnetic dipole beacon", "dipole beacon", "beacon", or "sonde" may refer to the same concept. Furthermore, corresponding compass readings from a compass in the wheel assembly and a compass in the locator can also provide a relative angular bearing between the wheel assembly and the locator. By way of another example, relative magnetic field strength measured at two antennas may provide a vertical height of the locator from the wheel assembly.

In one aspect, the disclosure relates to a ground tracking system. In an exemplary embodiment, a plurality of magnets may be disposed within the floating wheels. One or more sensor elements, such as three-axis accelerometers and one or more three-axis compass sensors may be disposed in the wheel assembly to measure the relative motion of each floating wheel, and generate an output signal corresponding to rotation, position, and/or other information. The wheel assembly may include various circuit elements including a central circular PCB, and magnetic sensor boards. The wheel assembly may further include one or more battery elements, such as a C-cell battery, to provide power to various circuit elements. The wheel assembly may optionally include a gyroscope, a barometer, and/or a tilt sensor. A High Q high frequency Sonde may be optionally included the ground tracking system.

In accordance with various other aspects, one or more magnets may be disposed in left and right floating wheels and one or more sensor elements, such as magnetic sensor elements, may be disposed within the wheel assembly (e.g., in the center wheel) to sense a rotation of left and right floating wheels, and to generate one or more output signals based at least in part on the sensed movement or position. The wheel assembly may further/alternatively include a compass element configured to generate a compass output signal corresponding to a position of the ground follower assembly. The ground tracking device may also/alternatively include an accelerometer (e.g., a three-axis accelerometer) that may be configured to generate an output signal corresponding to a motion of the ground follower assembly. A GPS receiver module or other terrestrial or satellite position location device may also/alternatively be included. The ground tracking device may further/alternatively include one or more sensor elements and associated hardware and signal processing circuits configured to sense a rotation of one or more wheels associated with translation motion, to sense tilt of the wheel assembly from a vertical plane or the tilt of one wheel with respect to another wheel or the vertical plane, to sense roughness of a surface, to sense steepness of a surface, to sense sudden elevation changes of a surface (e.g., when the wheel assembly descends down or ascends up a curb or other object), to sense acceleration up or down a surface, to sense whether the wheel assembly is sliding against the surface, and to sense other environmental conditions.

Other aspects relate to ground tracking device comprising one or more sensors configured to determine motion, position, and/or orientation information relating to the ground tracking device or a component of the ground tracking device. The motion, position or orientation information may comprise any-dimension motion, position or orientation information.

In accordance with one aspect, the one or more sensors comprise one or more accelerometers, compasses, magnetic sensors, GPS or other location-based receivers, or gyroscopes. The one or more sensors may be configured to: generate one or more output signals representative of a motion of the ground tracking device or the component over a surface; generate one or more output signals representative of a position and an orientation of the ground tracking device or the component over a surface; measure a translational movement of the ground tracking device or the component relative to a surface; measure a rotational movement of the ground tracking device or the component relative to a surface; measure a position of a wheel relative to a position of a locator assembly; measure an orientation of a wheel relative to a locator assembly; measure an orientation of a wheel relative to a fixed point on a surface; measure a direction of rotation and an amount of rotation of a wheel relative to a fixed point on a surface; measure a distance traveled by a wheel over a surface during a time period; measure a direction a wheel is traveling at a point in time; measure a movement of a first wheel relative to a movement of a second wheel; measure respective movements of two wheels relative to a movement of another wheel; measure a first direction in which a first wheel turns and a second direction in which a second wheel turns (e.g., when the first direction and the second direction are different, the ground tracking device determines that the component of the ground tracking device is rotating about a point on a surface); and/or measure a first distance in which a first wheel turns and a second distance in which a second wheel turns (e.g., when the first distance and the second distance are different, the ground tracking device determines that the component of the ground tracking device is traveling along an arc over a surface).

In accordance with another embodiment, the ground tracking device may include a wheel assembly with a first outer wheel, a second outer wheel and a center wheel. The center wheel may be disposed between the first and second outer wheels, and the first and second outer wheels may be floating wheels relative to the center wheel and further configured to maintain contact with an uneven surface. The first outer wheel may comprise a flexible mechanism configured to permit the first outer wheel to move in a vertical direction relative to the center wheel. The flexible mechanism may comprise one or more spiral spokes.

The wheel assembly may also include some or all of the one or more sensors, which are configured to: measure a position of a wheel assembly relative to a position of a locator assembly; measure an orientation of a wheel assembly relative to a locator assembly; measure an orientation of a wheel assembly relative to a fixed point on a surface; measure a direction of rotation and an amount of rotation of a wheel assembly relative to a fixed point on a surface; measure a distance traveled by a wheel assembly over a surface during a time period; and/or measure a direction a wheel assembly is traveling at a point in time.

The ground tracking device may further include a locator assembly, a coupling element configured to couple the locator assembly to the wheel assembly, and a circuit or other processing element. The wheel assembly may comprise an inductor, and the locator assembly may comprise one or more antenna nodes configured to measure the magnetic field strength and one or more magnetic field lines of the inductor. In such embodiments, an inductor may refer to a magnetic dipole beacon such as a sonde. The coupling element may be configured to permit the wheel assembly to swivel around the locator assembly. The circuit may be configured to determine an approximate height of a first antenna node from a surface based on two measurements of the magnetic field strength of the inductor at two different instances in time by a second antenna node. In addition, or alternatively, the circuit may be configured to determine a swivel angle based on an angle of the one or more magnetic field lines relative to a reference plane.

In accordance with another embodiment, the ground tracking device may include a circuit configured to determine one or more characteristics of a surface based on the motion, position, or orientation information. The one or more characteristics include one or more of an elevation of particular points on the surface, a terrain profile of the surface, a surface area of the surface, a composition of the surface, or a contour of the surface across a surface area.

In another embodiment, a rolling ground tracking device may be configured to couple to a locator or other device and trail behind the device to act as a ground tracking device, such as described herein, an induction device, to generate signals for induction of signals into buried objects, or both. Examples of induction device embodiments and details as may be combined with the disclosures herein are described in, for example, co-assigned U.S. Provisional Patent Application Ser. No. 61/781,889, filed Mar. 14, 2013, entitled OMNI-INDUCER TRANSMITTING DEVICES AND METHODS, which is incorporated herein.

In another embodiment, a rolling or moving element, such as a wheel, axle, or other rolling element, or bracket, swing arm, or other moving element, may include one or more sondes. At least one sonde may have an axis that is not coincident with the rolling axis. The rolling element may be coupled to a buried object locator or other instrument, tool, or device. The device may be configured to track the position and/or rotation of one or more of the sondes while rolling and measure it's own movement over the ground relative to the position or rotation. The device may also be configured to detect induced signals from buried objects from transmitted signals from the one or more rolling sondes.

In another embodiment, a rolling or moving element, such as a wheel, axle, or other rolling element, or bracket, swing arm, or other moving element, may include an orthogonal array of three sondes. The axis of rotation may be positioned at approximately equal angles to each antenna coil, and signals may be transmitted from the sondes for use by a locator in determining rotation or other motions.

In another embodiment, one or more batteries may be configured to have a long axis that is coincident with the axis of rotation one or more the rolling structures. The batteries may be used in a wheel or other rolling element in various embodiments.

In another embodiment, a connecting arm that is configured to pivot with a pivoting assembly may be coupled around an axis, such as a vertical axis, attached to a locator or other device. One or more sondes may be disposed on or within the arm to determine movement similarly to movement detection with respect to a rolling element such as a wheel.

In another embodiment, a flexible connecting arm may be disposed between the locator and a rolling element, such as a wheel or axle, that includes a sonde array. Various lengths of flexible arms may be used. The flexible arm may be flexible both in bending and in twisting motions. The flexible arm may include both rigid sections and pivoting joints.

In another embodiment, a flexible connecting arm may be disposed between the locator and a rolling sonde array. A trailing end of the connecting arm may be be secured to the locator for transport and storage.

In another embodiment, a detection circuit for sensing movement or rotation and automatically waking up a coupled device, such as a locator or sonde array, from a low power state or off state may be included or coupled to a rolling element such as a wheel or axle. Upon waking or powering up, the device, such as a sonde array, may begin transmitting. Such a circuit may be used to conserve power in a sonde array powered by a batteries and/or in a coupled locator.

In another embodiment, two or more transmitting coils that transmit at different frequencies may be included, such as in a rolling device such as a wheel and/or a rolling sonde array element. In another embodiment, two or more transmitting coils that transmit in a timed sequence may be included. In another embodiment, two or more transmitting coils that are oriented orthogonally to each other may be included. In another embodiment, two or more transmitting coils that employ primary and secondary coils on each axis may be included. In such a configuration, the secondary coil may be part of a circuit that include a capacitor. In another embodiment, two or more transmitting coils that have a resonant Q of greater than 10 may be included.

In another embodiment, a rechargeable battery may be included. The rechargeable battery may be coupled to a sonde array to provide power to the sonde array. The rechargeable battery element may be configured, in conjunction with a circuit in the rolling device, moving element, or sonde array, to be recharged by inductive charging from an inductive charging device. In another embodiment, the rechargeable battery may be configured, in conjunction with a circuit in the rolling device, moving element, or sonde array, to be charged from a USB port or other serial or parallel data interface port.

In another embodiment, a wireless data module for providing a data communications link from the rolling Sonde array to the locator may be included in the rolling element or sonde array. The wireless link ma be a Bluetooth, or Bluetooth LE link, or Wi-Fi or other wireless communications link In another embodiment, two or more transmitting coils that transmit in a specific phase relationship to each other may be included in a rolling device or sonde array. The two or more transmitting coils may be phase locked to one another. In another embodiment, three or more transmitting coils that are all in phase at a periodic interval of time may be included. In another embodiment, two or more transmitting coils that use or are provided with a signal using a single clock may be included. In another embodiment, two or more transmitting coils that use a single clock that is accurate to better than 20 ppm may be used. In another embodiment, two or more transmitting coils of a sonde array that are mounted inside an approximately spherical structure may be used. In another embodiment a two or more wheeled structure or device, each with one or more independently rotating transmitting sondes, may be provided. The two or more rotating structures or devices may be configured to be able to detect pivoting rotation against the ground. In another embodiment, at least one 18650 rechargeable lithium battery may be used to power one or more sondes.

In a rolling sonde array embodiment, sets of sonde transmit frequencies may be, for example, 90 kHz, 91 kHz, 92 kHz, or 70 kHz, 80 kHz, 90 KHz.

Various embodiments in accordance with details of the present disclosure may be used or combined with details of buried object locators and/or sondes and associated components as described in co-assigned applications. For example, various ground tracking device embodiments in accordance with aspects disclosed herein may be combined with details of locators and sondes such as are described in U.S. Pat. Nos. 7,009,399, 7,332,901, 7,336,078, 7,443,154, 7,518, 7,619, 516, 7,733,077, 7,741,848, 7,755,360, 7,825,647, 7,830,149, U.S. Patent Publication 2011/0006772, and U.S. patent application Ser. No. 13/161,183 (collectively referred to herein as the "related applications"). The content of each of these patents, publications and applications is incorporated by reference herein in its entirety for all purposes.

Various other aspects of apparatus, devices, configurations, and methods that may be used in ground tracking embodiments as disclosed herein are described in U.S. patent application Ser. No. 13/677,223, filed Nov. 14, 2012, entitled MULTI-FREQUENCY LOCATING SYSTEMS & METHODS, U.S. patent application Ser. No. 13/570,211, filed Aug. 8, 2012, entitled PHASE-SYNCHRONIZED BURIED OBJECT LOCATOR APPARATUS, SYSTEMS, AND METHODS, U.S. patent application Ser. No. 13/161,183, filed Jun. 15, 2011, entitled GROUND-TRACKING DEVICES FOR USE WITH A MAPPING LOCATOR, U.S. patent application Ser. No. 13/766,670, filed Feb. 13, 2013, entitled OPTICAL GROUND TRACKING LOCATOR DEVICES & METHODS, U.S. Provisional Patent Application Ser. No. 61/679,672, filed Aug. 3, 2012, entitled OPTICAL GROUND TRACKING APPARATUS, SYSTEMS & METHODS, U.S. patent application Ser. No. 10/268,641, filed Oct. 9, 2002, entitled OMNIDIRECTIONAL SONDE AND LINE LOCATOR, U.S. patent application Ser. No. 11/077,947, filed Mar. 11, 2005, entitled SINGLE AND MULTI-TRACE OMNIDIRECTIONAL SONDE AND LINE LOCATORS AND TRANSMITTER USED THEREWITH, U.S. patent application Ser. No. 11/932,205, filed Oct. 31, 2007, entitled OMNIDIRECTIONAL SONDE AND LINE LOCATOR, U.S. patent application Ser. No. 12/579,539, filed Oct. 15, 2009, entitled SINGLE AND MULTI-TRACE OMNIDIRECTIONAL SONDE AND LINE LOCATORS AND TRANSMITTER USED THEREWITH, U.S. patent application Ser. No. 12/902,551, filed Oct. 12, 2010, entitled OMNIDIRECTIONAL SONDE AND LINE LOCATOR, U.S. patent application Ser. No. 12/916,886, filed Nov. 1, 2010, entitled SINGLE AND MULTI-TRACE OMNIDIRECTIONAL SONDE AND LINE LOCATORS AND TRANSMITTER USED THEREWITH, U.S. patent application Ser. No. 12/916,886, filed Nov. 1, 2010, entitled SINGLE AND MULTI-TRACE OMNIDIRECTIONAL SONDE AND LINE LOCATORS AND TRANSMITTER USED THEREWITH. U.S. patent application Ser. No. 10/956,328, filed Oct. 1, 2004, entitled MULTI-SENSOR MAPPING OMNI-DIRECTIONAL SONDE AND LINE LOCATORS AND TRANSMITTER USED THEREWITH, U.S. patent application Ser. No. 11/970,818, filed Jan. 8, 2008, entitled MULTI-SENSOR MAPPING OMNIDIRECTIONAL SONDE AND LINE LOCATOR, U.S. patent application Ser. No. 12/103,971, filed Apr. 16, 2008, entitled LOCATOR AND TRANSMITTER CALIBRATION SYSTEM, U.S. patent application Ser. No. 12/243,191, filed Oct. 1, 2008, entitled MULTI-SENSOR MAPPING OMNIDIRECTIONAL SONDE AND LINE LOCATORS AND TRANSMITTER USED THEREWITH, U.S. patent application Ser. No. 12/780,311, filed May 14, 2010, entitled SONDE ARRAY FOR USE WITH BURIED LINE LOCATOR, U.S. patent application Ser. No. 12/826,427, filed Jun. 29, 21010, entitled LOCATOR AND TRANSMITTER CALIBRATION SYSTEM, U.S. patent application Ser. No. 13/356,408, filed Jan. 23, 2012, entitled SONDES & METHODS FOR USE WITH BURIED LINE LOCATOR SYSTEMS, U.S. patent application Ser. No. 10/886,856, filed Jul. 8, 2004, entitled SONDES FOR LOCATING UNDERGROUND PIPES AND CONDUITS, U.S. patent application Ser. No. 11/683,553, filed Mar. 8, 2007, entitled SONDES FOR LOCATING UNDERGROUND PIPES AND CONDUITS, U.S. Provisional Patent Application Ser. No. 61/789,074, entitled SONDE DEVICES INCLUDING A SECTIONAL FERRITE CORE STRUCTURE, filed Mar. 15, 2013 and U.S. patent application Ser. No. 11/864,980, filed Sep. 29, 2007, entitled SONDES FOR LOCATING UNDERGROUND PIPES AND CONDUITS. The content of each of these applications is hereby incorporated by reference herein in its entirety for all purposes. Various details as described in these incorporated applications and/or in the applications to which this application claims priority may be combined with the disclosures herein in various additional embodiments. For example, locators as described in the incorporated applications may include details of implementations of sondes and sonde arrays as described herein and/or in other incorporated applications or priority applications. Systems including locators, buried object transmitters, and other system elements may include ground tracking embodiments as described herein. Processing of sonde signals may be implemented using antennas, signal processing circuits, processing elements, storage elements, memory, and/or display elements or devices as described in the priority and/or incorporated applications.

The term "exemplary" is used herein to mean "serving as an example, instance, or illustration." Any aspect and/or embodiment described herein as "exemplary" is not necessarily to be construed as preferred or advantageous over other aspects and/or embodiments.

Example Ground Tracking System Embodiments

Referring to FIG. 1, an embodiment of a ground tracking system 100, in use, is illustrated in accordance with aspects of the present disclosure. In one aspect, ground tracking system 100 may include a measurement device, such as a portable locator 110, for detecting a series of electromagnetic signals 105 radiated or emitted from a buried object 103, such as such as an electrical power transmission cable, which may be disposed under the surface of ground 107 (such as under a street, soil or grass, concrete, or other surface), and a ground follower assembly 120 to follow the ground or other surfaces, and provide sensed data with respect to multiple positions and movements of the locator 110 relative to the ground or other surfaces. Locator 110 may include one or more antenna nodes, such as, for example, an upper antenna node 112, and a lower antenna node 114, which may be disposed on a mast 116. In one aspect, ground follower assembly 120 may be coupled to lower antenna node 114 of the locator 110. In an exemplary embodiment, the ground follower assembly 120 may be detachable such that the ground follower assembly 120 may be readily attached or removed from the locator 110. Although not shown in FIG. 1, ground follower assembly may comprise a wheel assembly (e.g., wheel assembly 230 or FIG. 2A).

In an exemplary embodiment, a separate transmitter (not shown) may provide an inductive magnetic field output for inducing alternating current (AC) in buried object 103, and/or current output from a separate transmitter (not shown) may be directly coupled to buried object 103. In some embodiments, the inducer or dipole beacon assembly may be configured to induce current into a buried conductor. The electromagnetic signal 105, such as electromagnetic signals generated by a current in a buried object 103, may be detected by the locator 110. Examples of portable locators include battery powered man portable utility locators such as those described in incorporated U.S. Pat. Nos. 7,009,399, 7,733,077, and 7,332,091.

Figure 2A:
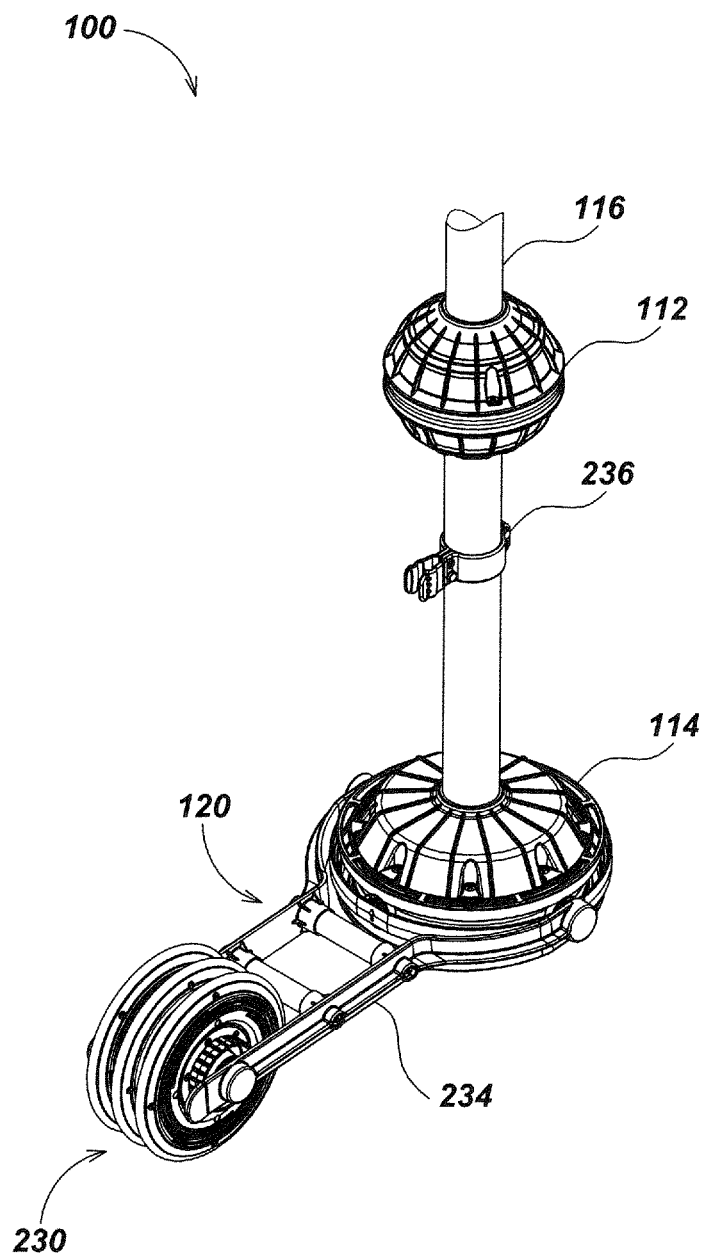
FIG. 2A is the ground tracking system embodiment of FIG. 1, illustrating details thereof.

One or more sensor elements and associated hardware and signal processing circuits may be used to sense relative position and motion, and other information Referring to FIG. 2A, details of ground tracking system embodiment 100 of FIG. 1 are illustrated. In an exemplary embodiment, a wheel assembly 230 may be coupled to a lower antenna node 114, such as, for example, a quad gradient node and/or any round antenna node disposed at the end of a locating device. An anchoring assembly, such as, for example, a yoke element 234 may be used to anchor the wheel assembly 230 to a race ring assembly (not shown in FIG. 2A), which may be disposed circumferentially at the equator of lower antenna node 114. A stowage clip 236, which may be disposed on mast 116, may be used to fold up the ground follower assembly 120 for compact stowage. In an exemplary embodiment, elements of the wheel assembly 230 may snap or lock into the stowage clip 236.

Figure 2B:
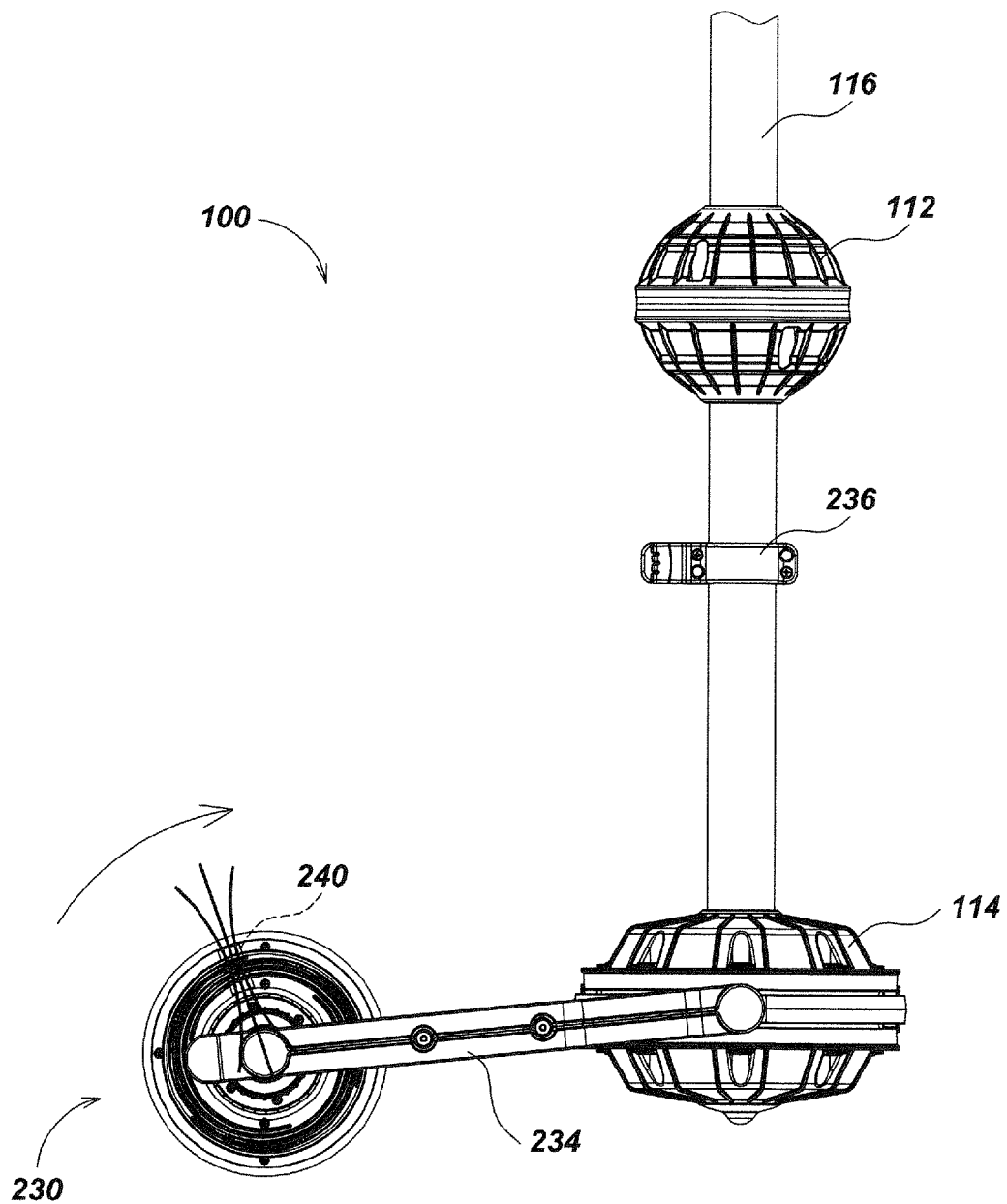
FIG. 2B is a side view of the embodiment from FIG. 1 with a dipole beacon in or on the wheel assembly.

As illustrated in FIG. 2B, a magnetic dipole beacon or beacons may be installed within or onto the wheel assembly 230. Such a dipole beacon may utilize, for instance, passive and/or radio-frequency identification (RFID) technology powered by a battery within the wheel assembly 230, yoke element 234, and/or locator 110 (FIG. 1). Excitation coil or coils within a locator 110 (FIG. 1) or other external transmitters may be used to activate one or more passive RFID beacons such as the passive RFID sonde 240 of FIG. 2B. In FIG. 2B, a single passive RFID sonde 240 positioned toward the edge of a wheel on the wheel assembly 230. In other embodiments, any number of beacons may be used in a number of different positions and orientations capable of operating in one or more different frequencies. In some embodiments, a passive RFID device disposed in a wheel or other element such as a support element, axle, bracket, and the like may be excited at a first frequency and may respond at a second frequency, that may be different than the first frequency. The received signal may be processed through a fast fourier transform (FFT) to determine position and/or motion.

Figure 2C:
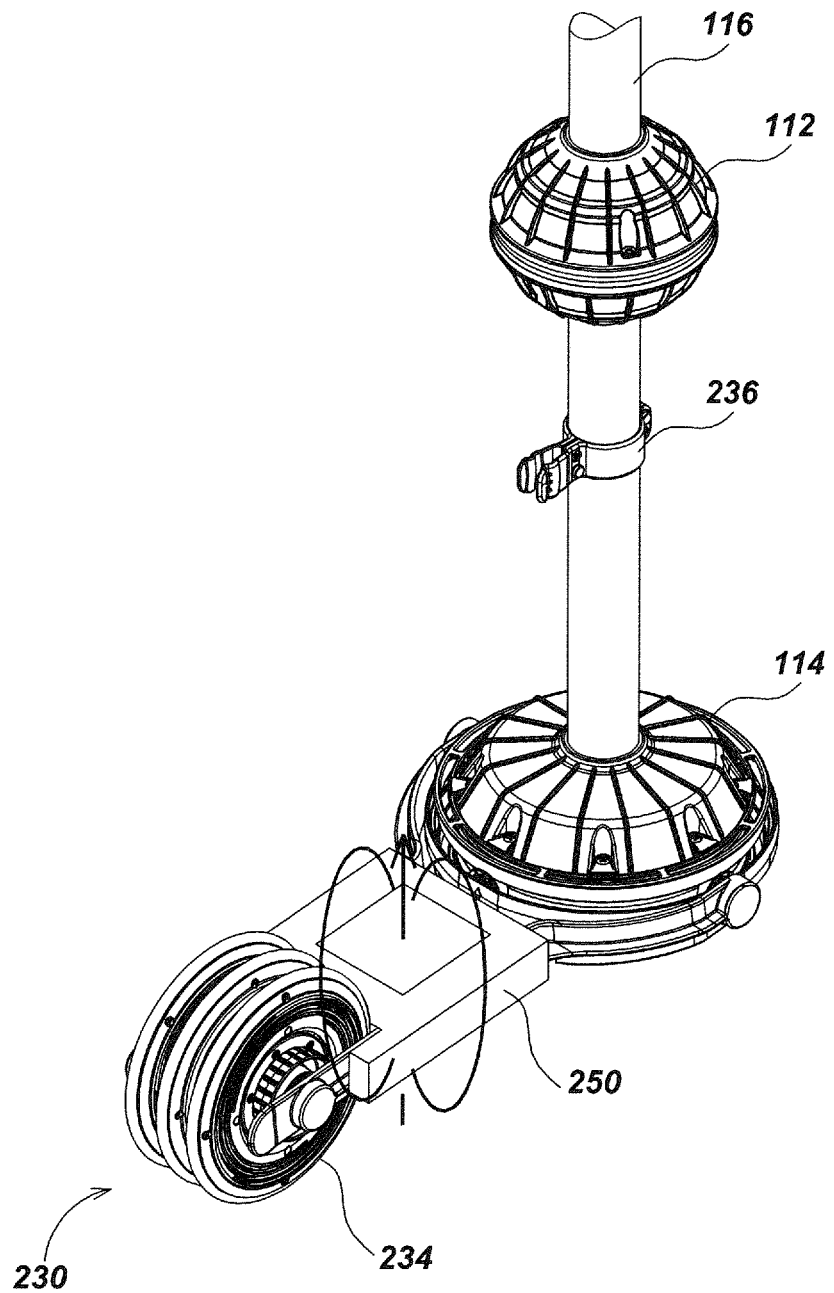
FIG. 2C is an isometric illustration of a dipole beacon embodiment installed on the yoke or arms of the wheel assembly.
Figure 2D:
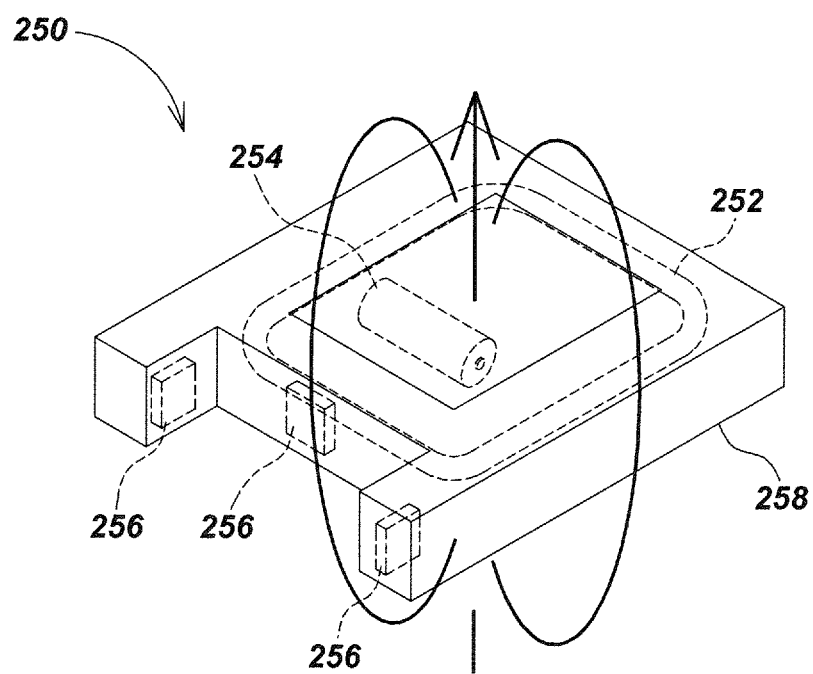
FIG. 2D is a detailed illustration of the yoke embodiment from FIG. 2C.
Figure 2E:
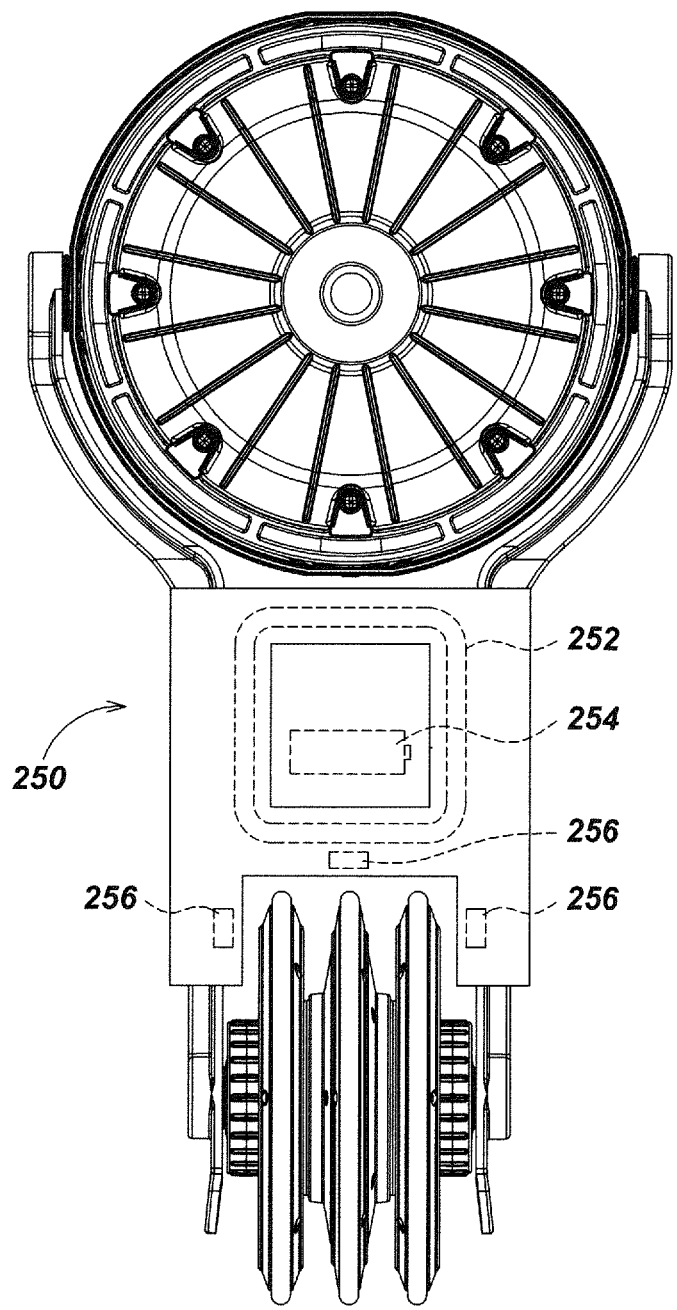
FIG. 2E is a bottom view illustration to the yoke embodiment from FIG. 2C.

Turning to FIG. 2C-2E, beacon and sonde assembly, such as the beacon and sonde assembly 250, may be built into or onto a yoke element such as the yoke element 234. As best illustrated in FIG. 2D, an assembly embodiment 250 may include a vertical dipole coil 252, a battery 254, and a series of magnetic sensors 256 which may be in or on a housing 258. In such embodiments, the wheel assembly may or may not include additional inducers or magnetic dipole beacons. Magnets (not illustrated) may be secured into or onto each wheel on the wheel assembly 234. The magnets may be positioned along the circumference of each wheel or otherwise positioned such that the magnetic sensors 256 may be used to sense rotations of each wheel.

Figure 3:
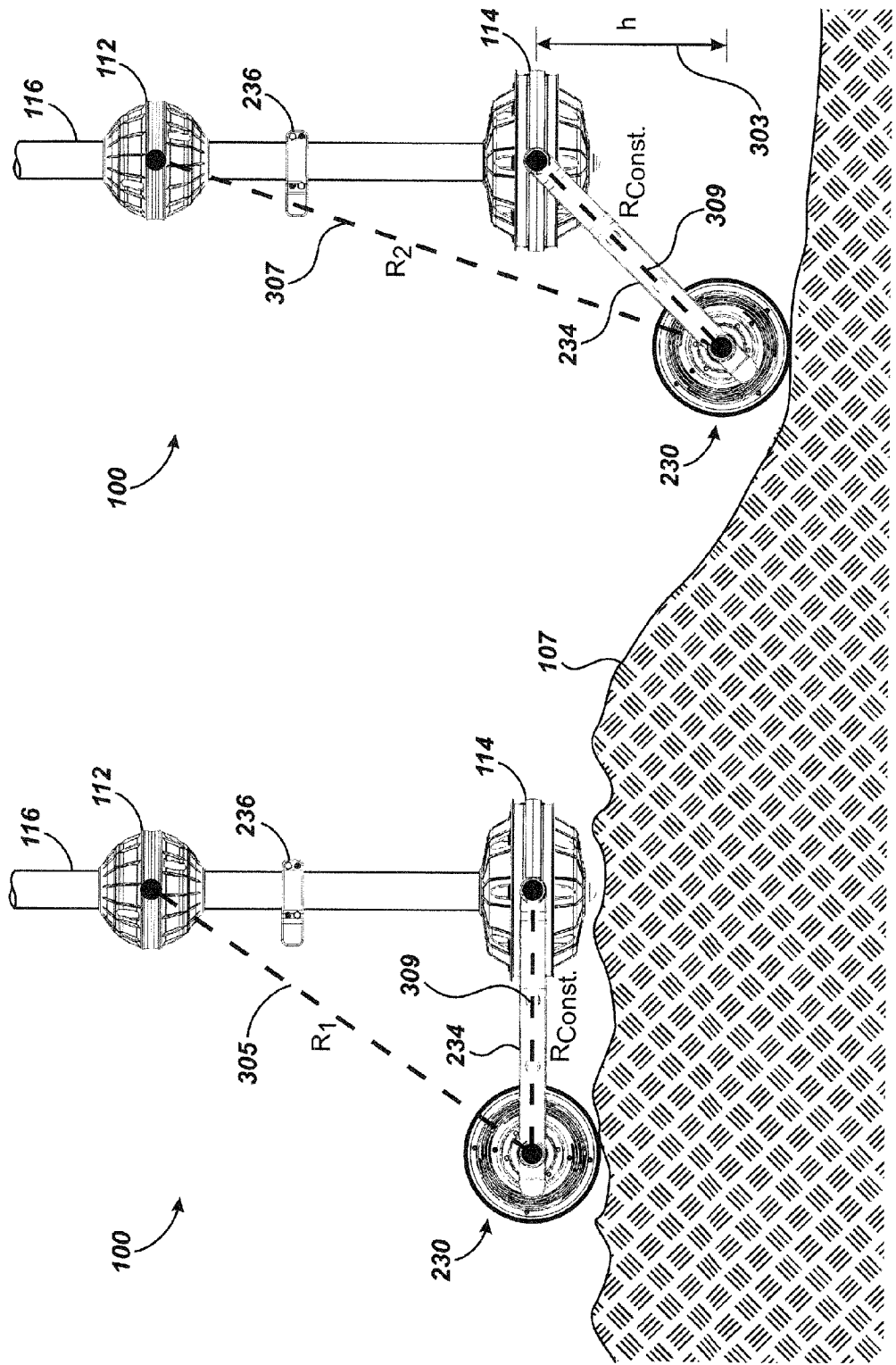
FIG. 3 illustrates a ground tracking system embodiment of FIG. 1, elevated above the ground or other surface.

FIG. 3 illustrates details of a ground tracking system embodiments 100 (FIGS. 1 and 2), moving across the surface of ground 107 or other surface. In one aspect, the wheel assembly remains in contact with ground 107. A height 303 may be determined by finding the magnetic (B) field strength, from a source (e.g., an inductor such as a Litz wire or a magnetic dipole sonde beacon disposed in the wheel assembly), at each antenna node, such as, upper antenna node 112 and lower antenna node 114. In one aspect, the distance from the wheel assembly to the center of the antenna node is proportional to $1/R^3$, where r is the distance from the source, so:

$$B_{upper} = K/R_{upper}^3$$

$$B_{lower} = K/R_{lower}^3$$

Therefore:

$$\frac{R_{upper}}{R_{lower}} = \left(\frac{B_{lower}}{B_{upper}}\right)^{1/3}$$

The bottom length is a known fixed quantity, so:

$$R_{top} = \left(\frac{B_{bottom}}{B_{upper}}\right)^{1/3} R_{bottom}$$

$R_{Const}$ 309 may be measured as the distance between the center of the wheel assembly 230 and annular race axle along the length of the yoke element 234. The distances between the upper/top antenna node 112 and the wheel assembly 230, such as R1 305 and R2 307, may be solved geometrically. Once the distances from the upper antenna to the wheel axle are known, such as R1 305 and R2 307, the approximate height 303 of the lower antenna 114 from the ground 107 may be calculated geometrically.

Other sensors may be used to determine R1 305 and R2 307, including acoustic sensors, optical sensors and/or other sensors.

Figure 4:
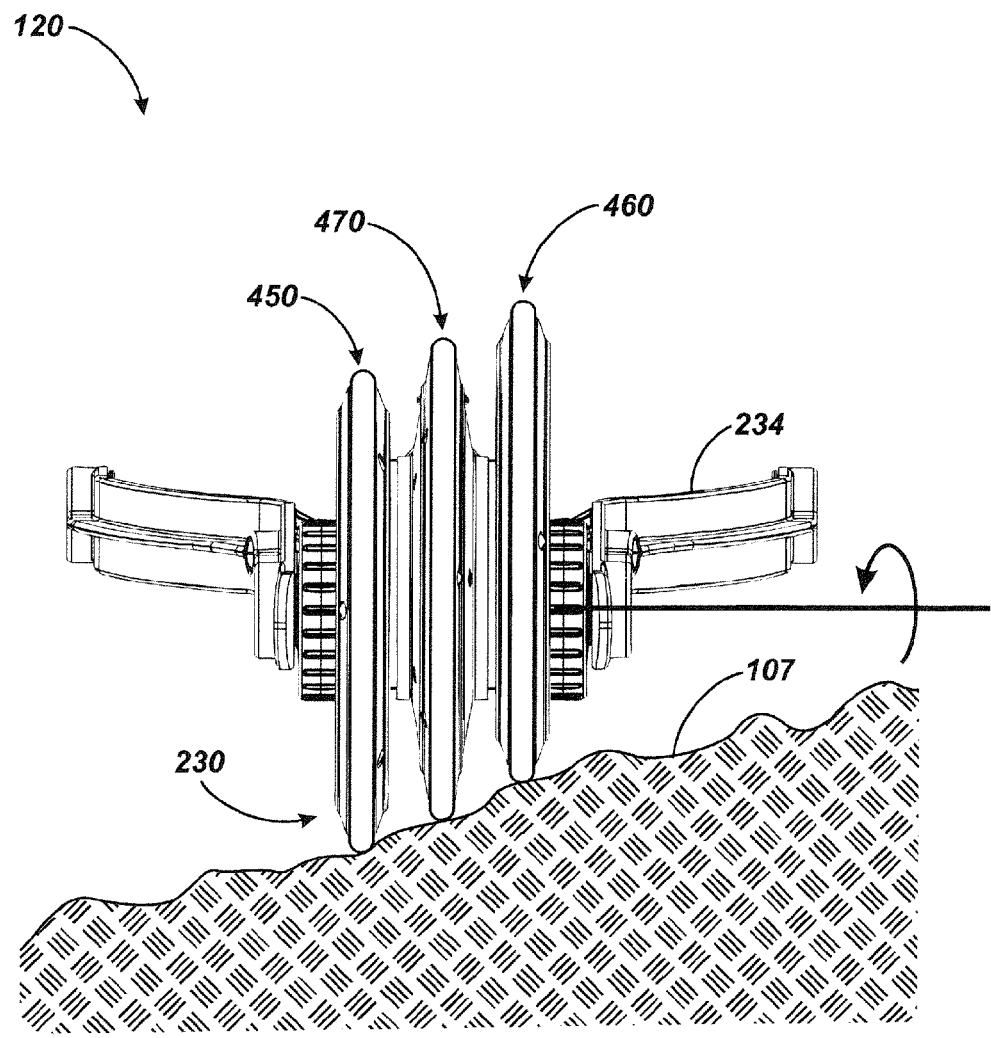
FIG. 4 is an enlarged detailed rear view of an embodiment of a ground follower assembly of FIGS. 1-3.

Referring to FIG. 4, an enlarged detailed rear view of ground follower assembly 120 including a wheel assembly 230 following over uneven terrain is illustrated. In an exemplary embodiment, wheel assembly 230 may include one or more wheels, such as, for example, a pair of floating wheels, such as a left floating wheel 450, a right floating wheel 460, and a fixed center wheel, such as center wheel 470. In one aspect, floating wheels 450 and 460 may include a flexible mechanism, such as spiral spokes (not shown in FIG. 4) to allow wheels 450, 460, and 470 to maintain contact with the ground simultaneously. For example, over an uneven terrain, left floating wheel 450 and right floating wheel 460 may each elevate (float upwards) or drop (float downward) to maintain contact with the varying surface of the ground 107, independently from one another and center wheel 470. For example, if an operator 102 turns or pivots, each of wheels 450, 460, and 470 may rotate in different directions relative to each other. Thus, the rotation on the ground may be measured by how wheels 450, 460, and 470 turn with respect to each other (like a pair of casters).

One or more magnets and/or other sensing elements (not shown in FIG. 4), such as three-axis magnetometers and/or a single axis Hall effect sensor, may be disposed in the wheel assembly to generate position and/or motion signals. Various circuit elements, such one or more compass chips (not shown) may be used to ascertain how floating wheels 450 and 460 turn relative to the center wheel 470. For example, a compass chip may be used to count the magnetic bumps to count the turns of left floating wheel 450 relative to floating wheel 460. An ISM (industrial, scientific and medical) radio or any other wireless technology may be used to transmit such data and information corresponding to wheel rotation and positional information. One or more compass sensors, one or more light sensors and/or a barometer may be disposed in the wheel assembly 230.

Figure 5A:
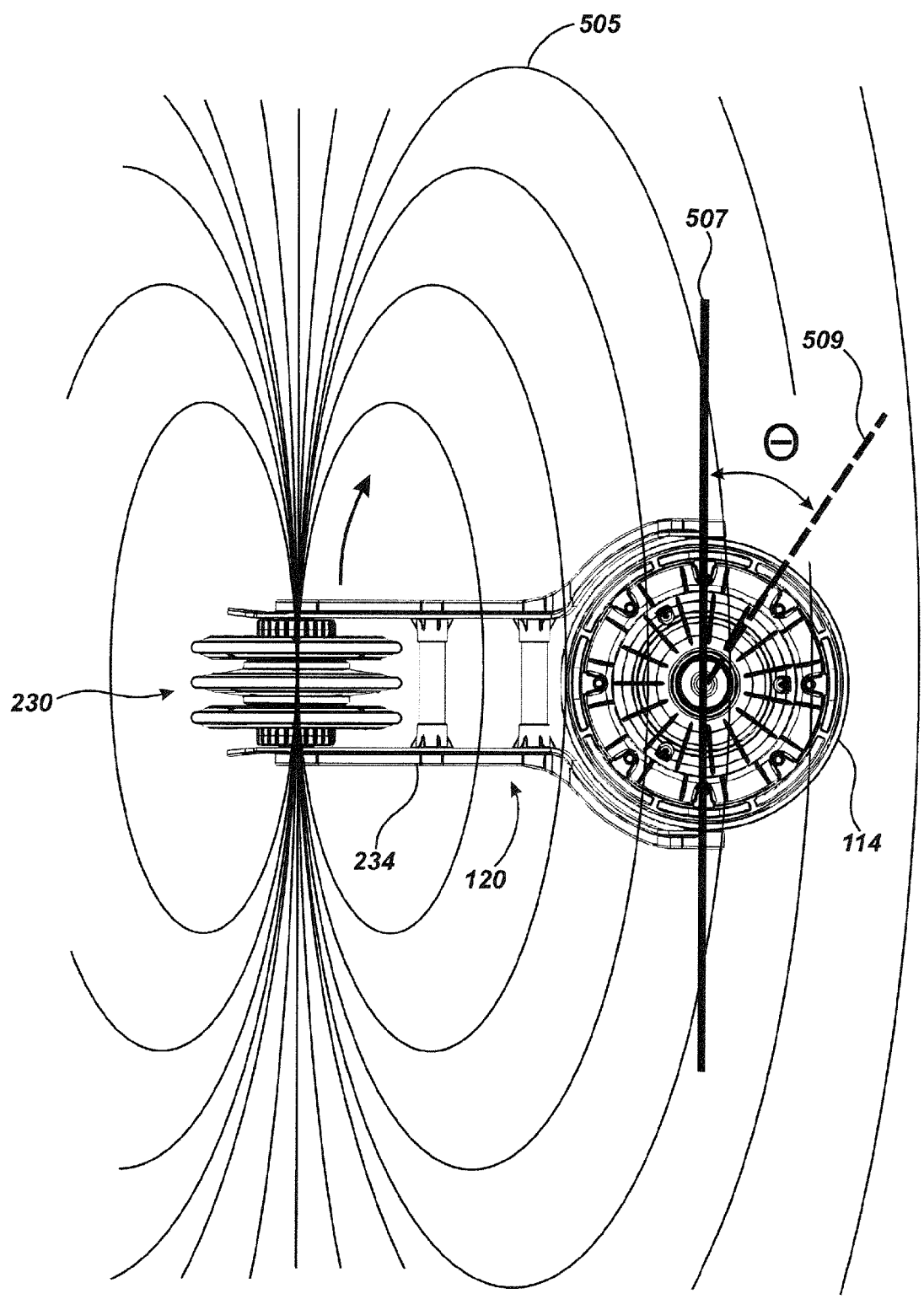
FIG. 5A illustrates details of an embodiment of the ground follower assembly of FIGS. 1-4 anchored to an antenna node.

Referring to FIG. 5A, a top view of a ground follower assembly 120 configured with lower antenna node 114 is illustrated. In one aspect, the ground follower assembly 120 may swivel around lower antenna node 114 in the clockwise or counter clockwise direction relative to a center line 507. In one aspect, an angle of rotation, such as angle θ 509 about center line 507 may be ascertained by measuring the angle of the B field lines 505, which may be generated by an inductor, such as a Litz wire (not shown in FIG. 5A), which may be disposed within the center wheel 470.

Figure 5B:
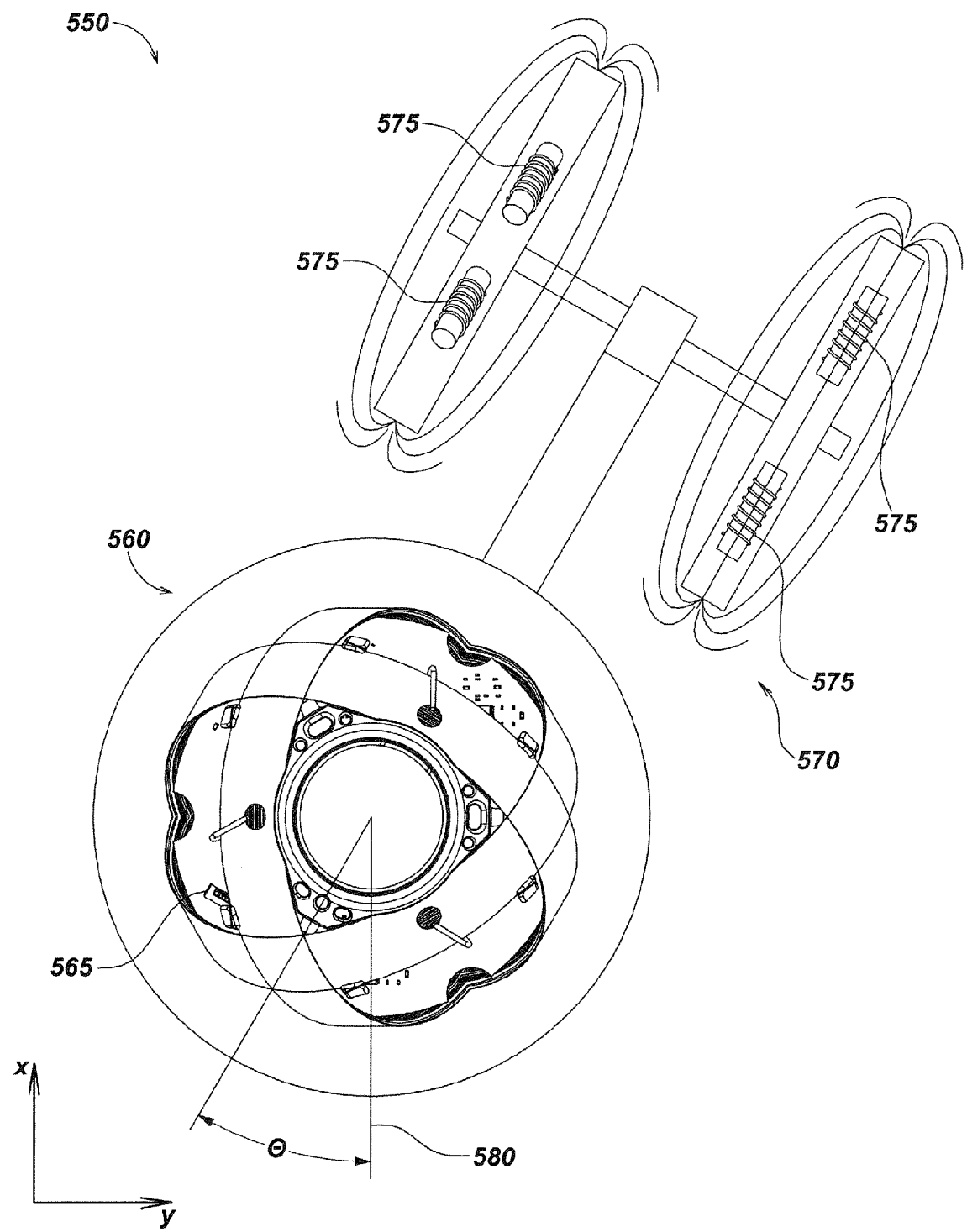
FIG. 5B illustrates a ground tracking embodiment anchored to an antenna node.

Turning to embodiment 550 of FIG. 5B, a locator 560 with an omni-directional antenna node 565, may be configured to determine the position of and/or measure the displacements of a ground tracking assembly 570 with one or more dipole beacons 575 as the ground tracking assembly 570 is made to rotate about a central z-axis of the omni-directional antenna node 565. For instance, the omni-directional antenna node 565 may be configured to measure the magnetic field of the dipole beacons 575 in both strength and direction. An angle θ 580 may be determined indicating a rotation of the ground tracking assembly 570 about the central z-axis of the omni-directional antenna node 565.

Figure 6:
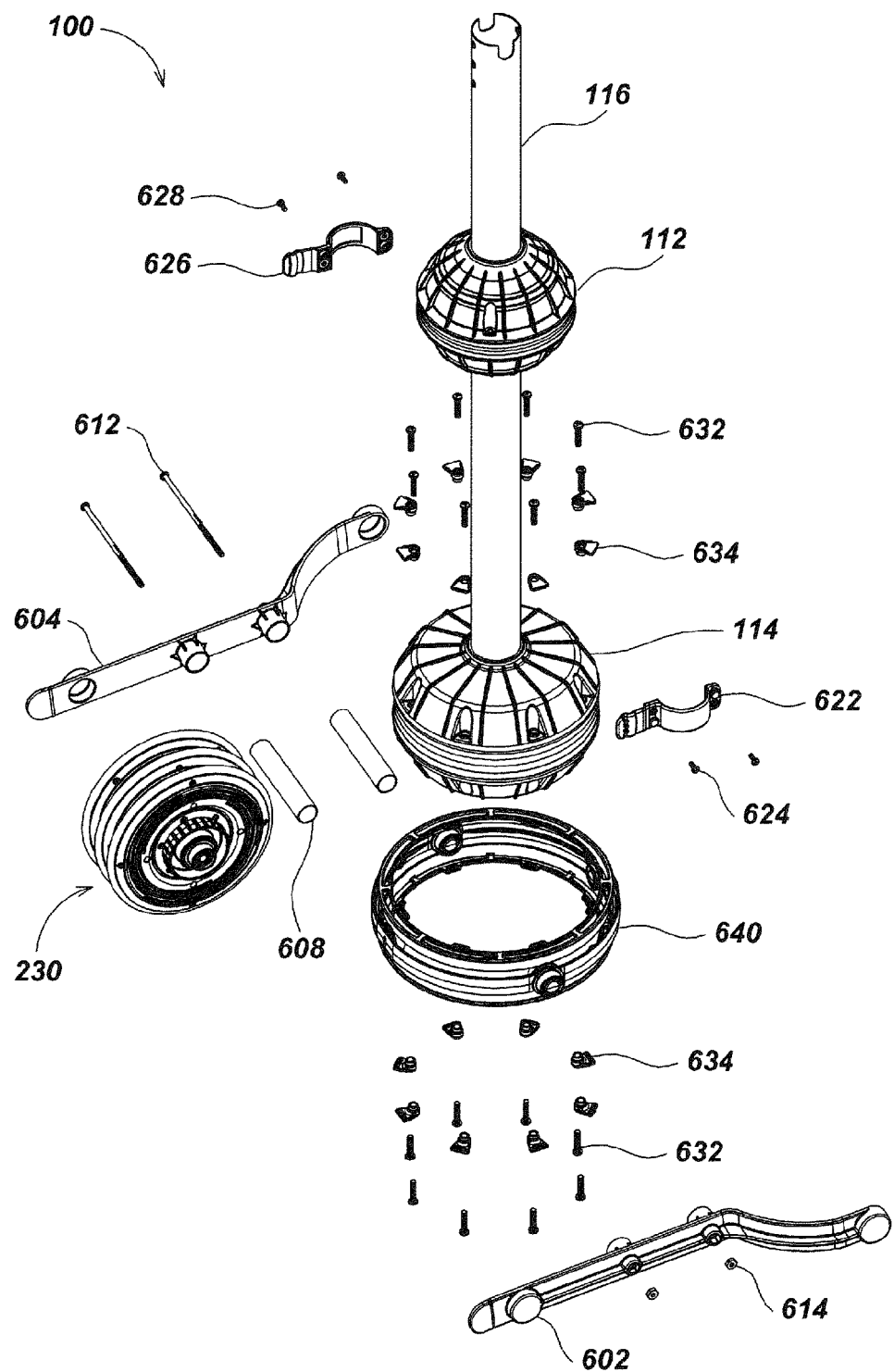
FIG. 6 is an exploded view of the ground tracking system embodiment of FIGS. 1 and 2, illustrating details thereof.

Referring to FIG. 6, an exploded view of the ground tracking system embodiment 110 (FIGS. 1 and 2) illustrates details. In one aspect, yoke element 234 may be formed of a right yoke arm 602 and a left yoke arm 604 and mounted to an annular race assembly 640 and wheel assembly 230.

One or more tubes, such as a pair of carbon cross tubes 608 may be disposed between right yoke arm 602 and left yoke arm 604 to provide stabilization of the ground follower assembly 120. Tubes 608 may be secured between right yoke arm 602 and left yoke arm 604 with one or more screws, such as a pair of long screws 612, and secured with one or more nuts, such as a pair of nuts 614. In an exemplary embodiment, annular race assembly 640 may provide a mechanism for 360 degree rotation of the ground follower assembly 120 around the lower antenna node 114.

A plurality of latches, such as one or more race ring latches 634 may be used to couple race rings (not shown in FIG. 6) of annular race assembly 640, such as, for example, upper race ring 742 and lower race ring 754 to the housing of antenna node 114 with one or more fasteners, such as race ring latch mounting screws 632.

The ground follower assembly 120 may be stowed in an upright configuration and locked into stowage clip 236. In an exemplary embodiment, ground follower assembly 120 may be folded upwards at the hinge or race axles 752 (see FIG. 7), which may be disposed on a race yoke element 744 (see FIG. 7). Stowage clip 236 may be formed of two halves, such as a right stowage clip half 622 and left stowage clip half 626 mounted together on mast 116 using one or more fasteners, such as right stowage mounting screws 624 and left stowage mounting screws 628.

Figure 7:
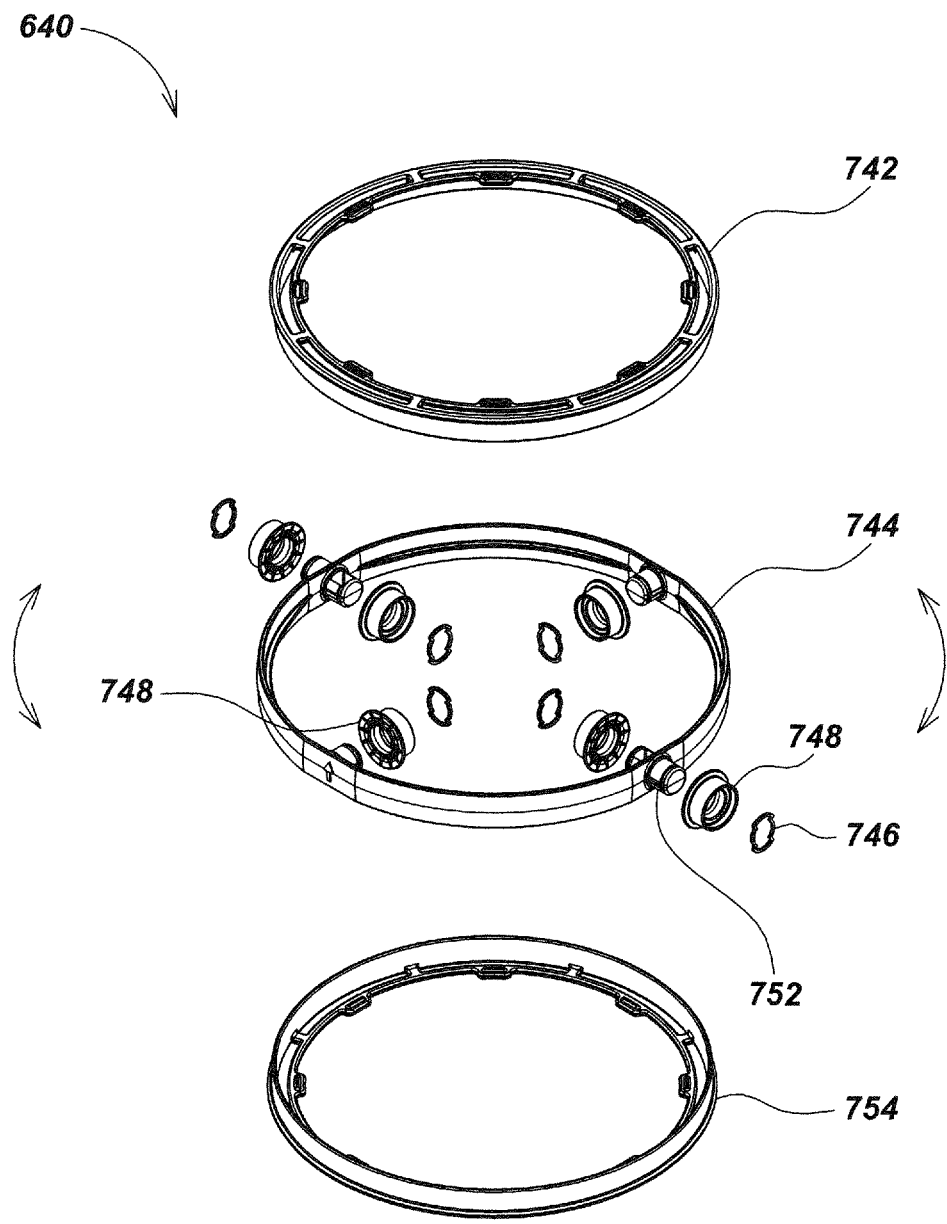
FIG. 7 is an exploded view of an embodiment of an annular race assembly of FIG. 6, illustrating details thereof.

Referring to FIG. 7, an exploded view of an embodiment of an annular race assembly 640 illustrates details of the race assembly 640. In one aspect, annular race assembly 640 may include one or more race rings, such as for example, upper race ring 742 and lower race ring 754, which may be fixed to the housing of antenna node 114. In assembly, a yoke race ring 744 may be disposed between upper race ring 742 and lower race ring 754. In an exemplary embodiment, a pair of axle elements 752 may be disposed on the outer surface of yoke race ring 744 to provide a hinge for coupling yoke element 234 (FIGS. 2-5) to yoke race ring 744, and for mounting one or more race roller elements 748 to provide a mechanism for the yoke race ring 744 to glide along upper race ring 742 and lower race ring 754. A pair of race roller elements 748 may be secured to axles 752, and may be retained with one or more fasteners, such as a pair of axle keeper snaps 746.

In assembly, upper race ring 742 and lower race ring 754 may be firmly secured to the housing of lower antenna node 114 with race ring latches 634. Yoke race ring 744 may slide freely on one or more race rollers 748 relative to fixed race rings, for example, upper race ring 742 and lower race ring 754.

Figure 8:
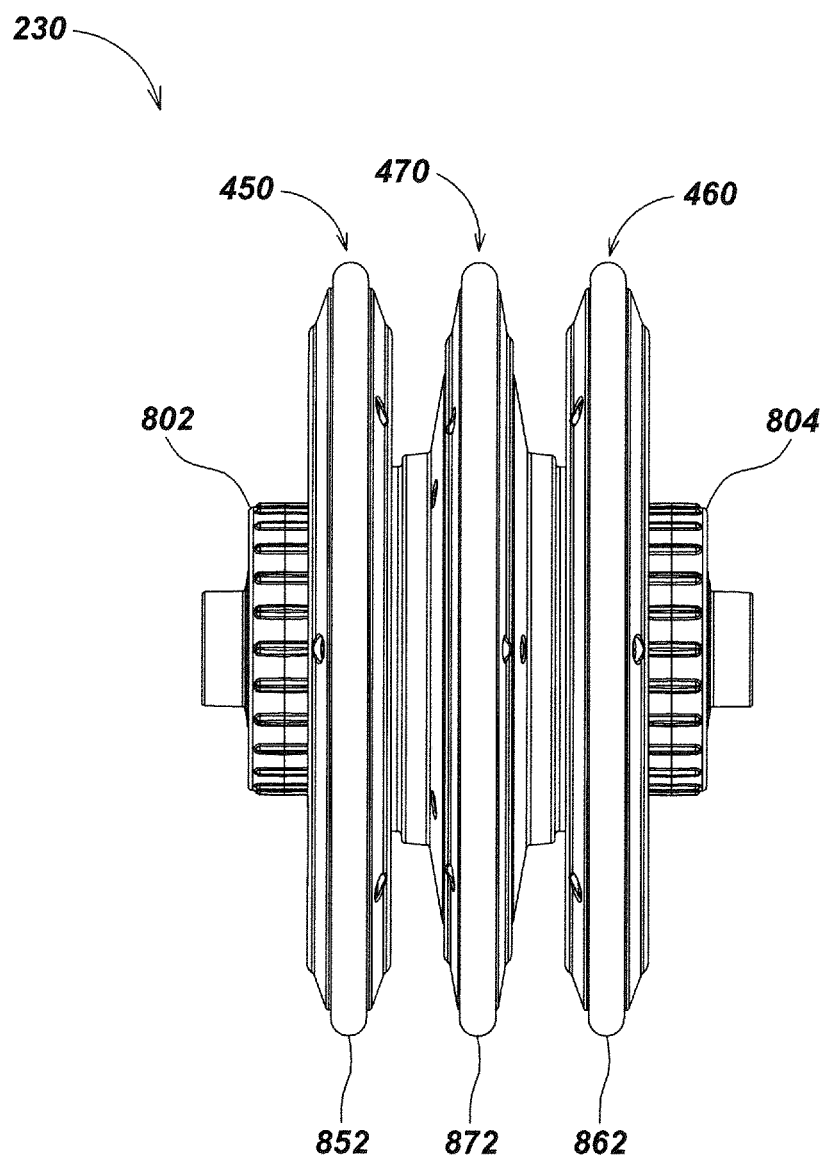
FIG. 8 is an enlarged detailed rear view of an embodiment of a wheel assembly of FIGS. 2-6.

Referring to FIG. 8, an enlarged detailed rear view of an embodiment of wheel assembly 230 illustrates details. In one aspect, wheel assembly may include wheel caps, such as, for example, a left wheel cap 802 and a right wheel cap 804, disposed on the outer surface of left floating wheel 450 and right floating wheel 460 to provide a mechanism for anchoring the yoke 234 to the wheel assembly. For example, left yoke arm half 604 and right yoke arm half 602 may be coupled to left wheel cap 802 and right wheel cap 804, respectively. In one aspect, left wheel cap 802 and a right wheel cap 804 may be used to capture and electrically connect a battery element to various circuit elements disposed in the wheel assembly. Left wheel cap 802 and a right wheel cap 804 may additionally protect the inner components from water, dirt, and dust.

In an exemplary embodiment, wheel assembly 230 may include a left floating wheel O-ring 852 stretched around left floating wheel 450, a right floating wheel O-ring 862 stretched around right floating wheel 460, and center floating wheel O-ring 872 stretched around center wheel 470, to provide traction between each wheels 450, 460, and 470, and the ground.

One or more magnets (not shown in FIG. 8) and/or other sensing elements may be disposed in floating wheels 450 and 460 to generate position and/or motion signals. In an exemplary embodiment, magnets, such as North and South magnets, may be configured in an alternating pattern and evenly spaced from one another.

Figure 9:
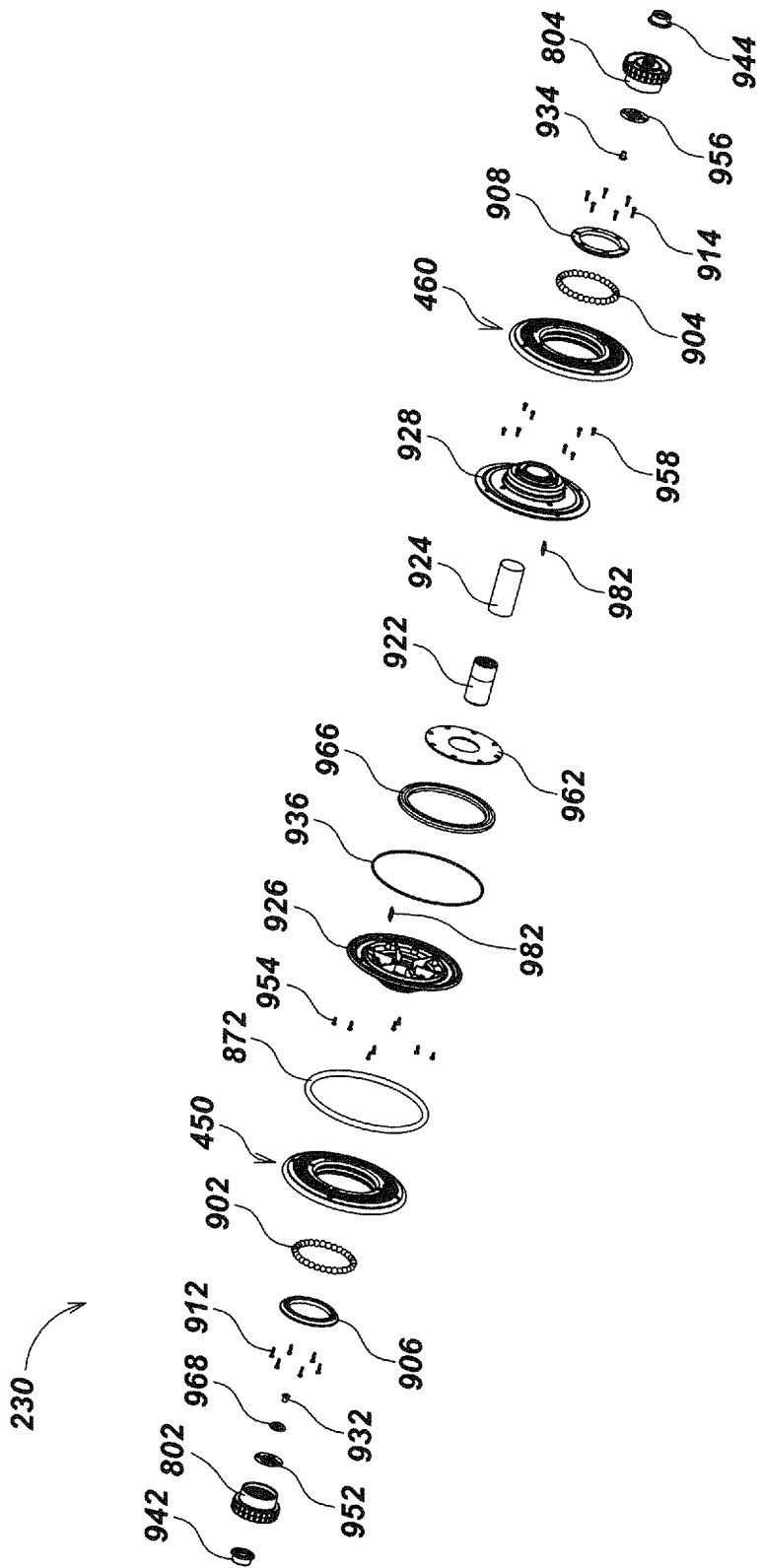
FIG. 9 is an exploded view of the wheel assembly embodiment of FIGS. 2-6, and 8, illustrating details thereof.

FIG. 9 is an exploded view of the wheel assembly embodiment 230 illustrating details thereof. In an exemplary embodiment, a pair of race rollers, such as left race roller 942 and right race roller 944, may be disposed on the outer surface of the wheel caps, such as left wheel cap 802 and right wheel cap 804, respectively to provide a mechanism to removably attach right and left yoke arm halves 602 and 604 from the wheel assembly 230.

In one aspect, center wheel 470 may be formed by a left center wheel housing half 926 and a right center wheel housing half 928, which may be mated and sealed with a sealing element, such as an O-ring 936, and secured with one or more fasteners, such as with left housing screws 954 and right housing screws 958. A battery element 922, such as a C-cell battery, may be disposed in a battery tube 924 within center wheel 470 to provide power to various circuitry of ground tracking system 100. The battery element 922 may be seated in battery tube 924, and press against various battery contact elements, such as disks, springs, clips or other metallic parts, which may be electrically connected to one or more circuit elements disposed in wheel assembly 230. Such contact elements may be sealed or compartmentalized within wheel caps 802 and 804 with various materials, such as foam or an O-ring. For example, a left battery contact disk 952 and a battery contact spring 968 may be secured together and onto the inside surface of left wheel cap 802 with a fastening element or rivet, such as a left eyelet 932. Likewise, a right battery contact disk element 956 may be disposed on the inner surface of right wheel cap 804, and may be secured by fastening element or rivet, such as a right eyelet 934. In assembly, the battery element 922 snaps in firmly between contact spring 968 and right battery contact disk element 956 to complete the circuit and provide power to various circuit elements, which may be disposed in wheel assembly 230, such as PCB 962 and one or more sensor boards, such as a pair of magnet sensor boards 982.

A plurality of discrete rolling elements, such as ball bearings, may be disposed in wheel assembly 230 to reduce friction between moving element, yoke race 744, and fixed elements, such as upper race ring 742 and lower race ring 754. Left floating wheel ball bearings 902 and right floating wheel ball bearings 904 may be made of various materials, such as Delrin®, Phenoxy®, or other similar polycarbonate resins or polymeric materials. In an exemplary embodiment, a plurality of left floating wheel ball bearings 902 may be disposed between left center wheel housing half 926 and left floating wheel 450. One or more fasteners, such as left capture plate screws 912 may be used to secure bearings 902 against left center wheel housing half 926 through one or more holes formed into a left capture plate 906. Likewise, a plurality of right floating wheel ball bearings 904 may be disposed between right center wheel housing half 928 and right floating wheel 460. One or more fasteners, such as right capture plate screws 914 may be used to secure bearings 904 against right center wheel housing half 928 through one or more holes formed into a right capture plate 908.

One or more circuit elements, such as PCB 962, and magnet sensor boards 982, may be disposed in the wheel assembly 230, such as for example, in the center wheel 470, for ascertaining and processing various signals, measurements, and other information. A coil of wire, such as a Litz wire 966, may be disposed within center wheel 470, to provide a dipole field, such as the B field lines 505 emitted from the center of lower antenna node 114, as shown in FIG. 5A. Information corresponding to B filed lines and various distance measurements provide a mechanism for determining the height of the lower antenna node 114 from the ground or other surface.

Figure 10:
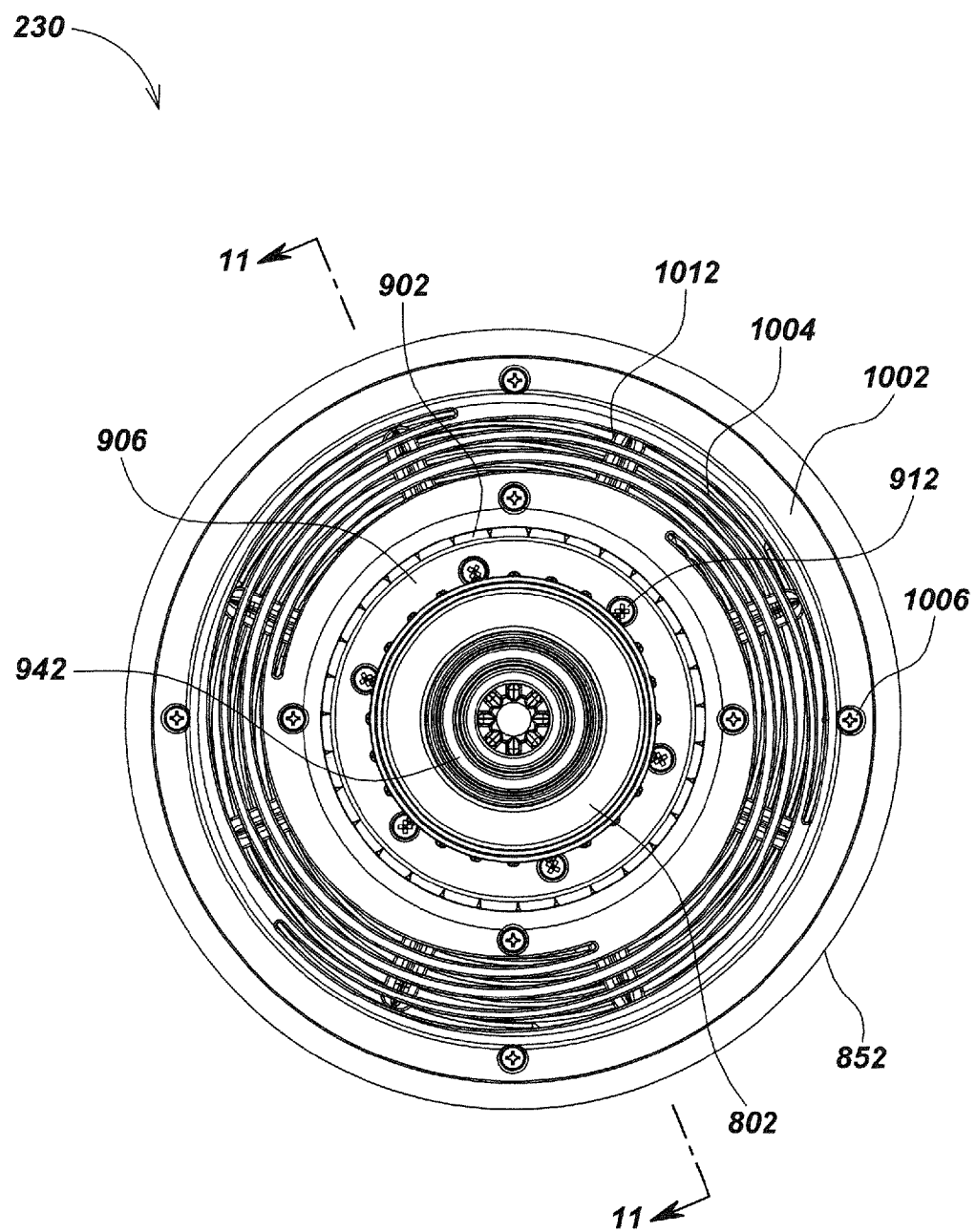
FIG. 10 is an enlarged detailed side view of the wheel assembly embodiment of FIGS. 2-6, and 8-9.

FIG. 10 is an enlarged detailed side view of the wheel assembly 230 of FIGS. 2-6, and 8-9. In an exemplary embodiment, a left floating wheel housing 1002 may be mated with a right floating wheel housing (not shown in FIG. 10), and mounted together with one or more fasteners, such as screws 1006. In one aspect, a plurality of spokes, such as spiral spokes 1004, may be formed in the hub of left floating wheel housing 1002 to provide a flexible or floating mechanism to allow floating wheels 450 and 460 to maintain contact with the ground when rolled across uneven terrain. One or more gap spacers 1012 may be disposed between left floating wheel housing 1002 and right floating wheel housing 1032 to capture magnets (not shown in FIG. 10) and to center spiral spokes 1004. For example, gap spacers 1012 may be used to prevent flexion of the spiral spokes 1004 in the horizontal direction.

Other flexible materials may alternately be used in place of and/or in combination with spiral spokes 1004. For example, coil springs, compression springs, hydraulic and/or pneumatic cylinders, and other materials used in various types of suspension systems may be used to provide a flexible mechanism for floating wheels 450 and 460 to roll over uneven terrain and maintain contact with the ground.

Figure 11:
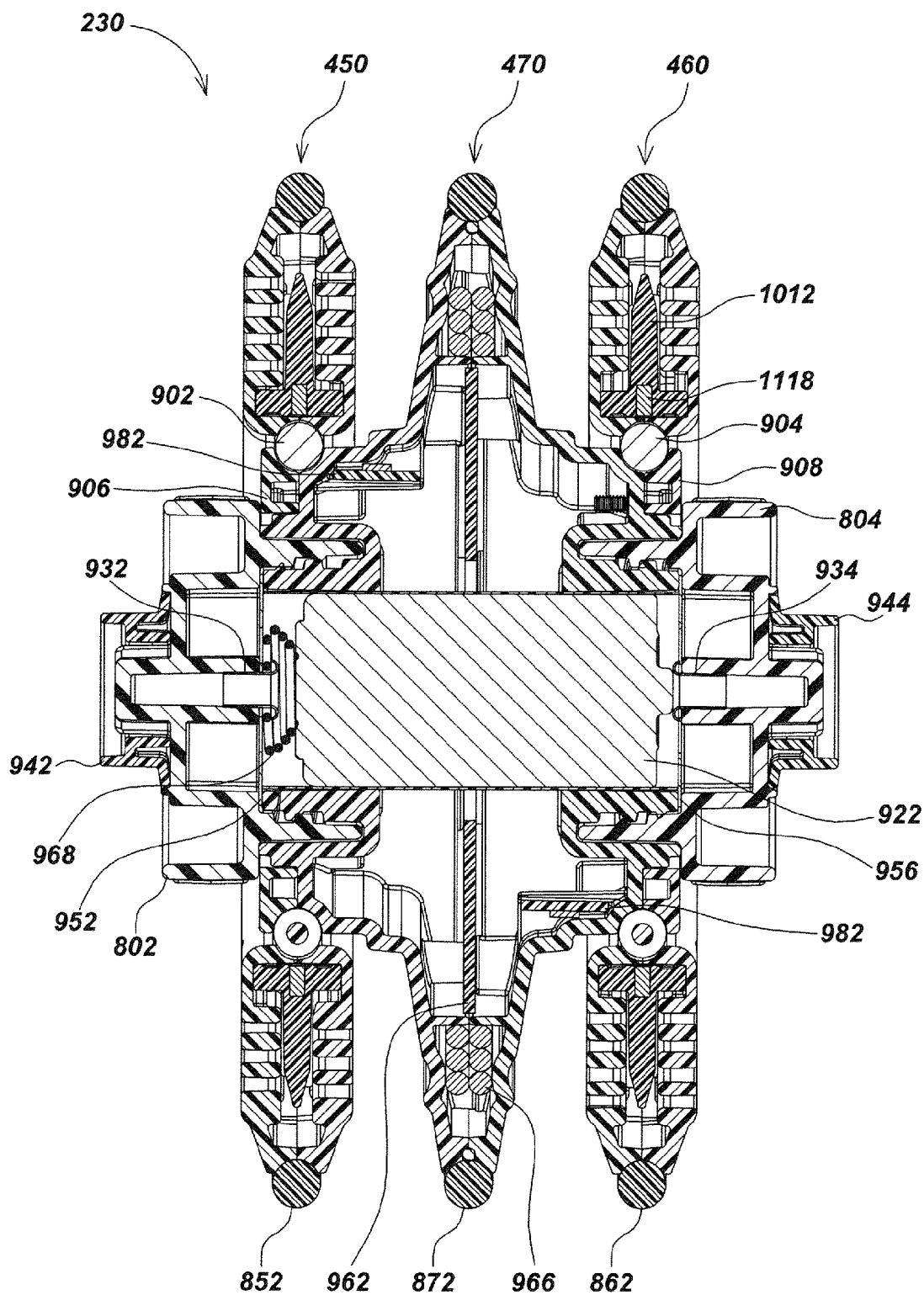
FIG. 11 is an enlarged vertical section view of the wheel assembly embodiment, taken along line 11-11 of FIG. 10.

FIG. 11 is an enlarged vertical section view of the wheel assembly 230, taken along line 11-11 of FIG. 10. In an exemplary embodiment, one or more gap spacers 1012 may be used to retain a plurality of magnets 1118 within floating wheels 450 and 460 (FIGS. 4, and 8-9) and maintain vertical alignment of spiral spokes 1004. For example, gap spacers 1012 may be used to limit flexion of the spiral spokes 1004 to the vertical direction. Magnets 1118 and gap spacers 1012 may be distributed radially in an alternating pattern (North-South), and evenly spaced from one another, within left floating wheel 450 and right floating wheel 460. In assembly, the battery element 922 snaps in firmly between contact spring 968 and right battery contact disk element 956 to provide power to various circuit elements, such as PCB 962 and magnet sensor boards 982 disposed in center wheel 470. Left floating wheel ball bearings 902 and right floating wheel ball bearings 904 may be disposed radially within wheel assembly 230 and retained by left bearing capture 906 and right bearing capture 908, respectively.

Figure 12:
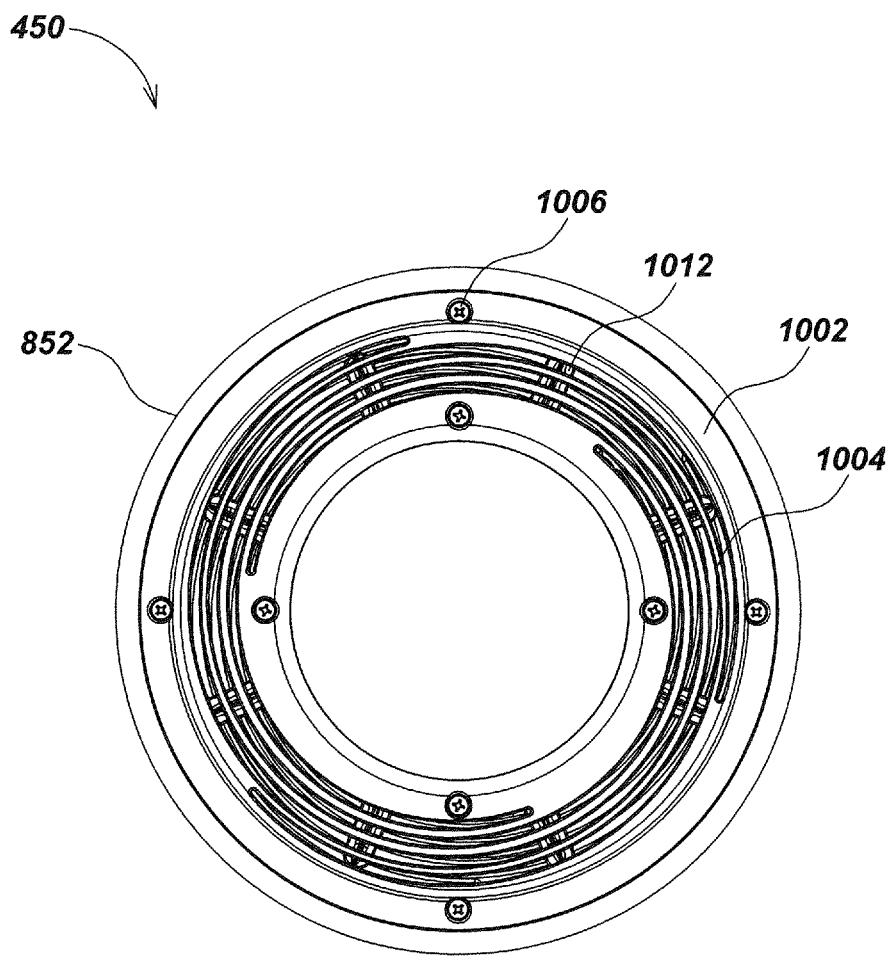
FIG. 12 is an enlarged detailed side view of an embodiment of a left floating wheel of FIGS. 8-11.

FIG. 12 is an enlarged detailed side view of an embodiment of a floating wheel of FIGS. 8-11. Spiral spokes may be formed into the housing of each of the floating wheels 450 and 460 (not shown in FIG. 12) in a spiral configuration to provide vertical flexion (up or down) when the ground follower assembly 120 is rolled across an uneven surface. Thus, the wheels 450 and 460 may essentially float up or down, depending on the surface of the ground, and maintain contact with the ground or surface.

Figure 13:
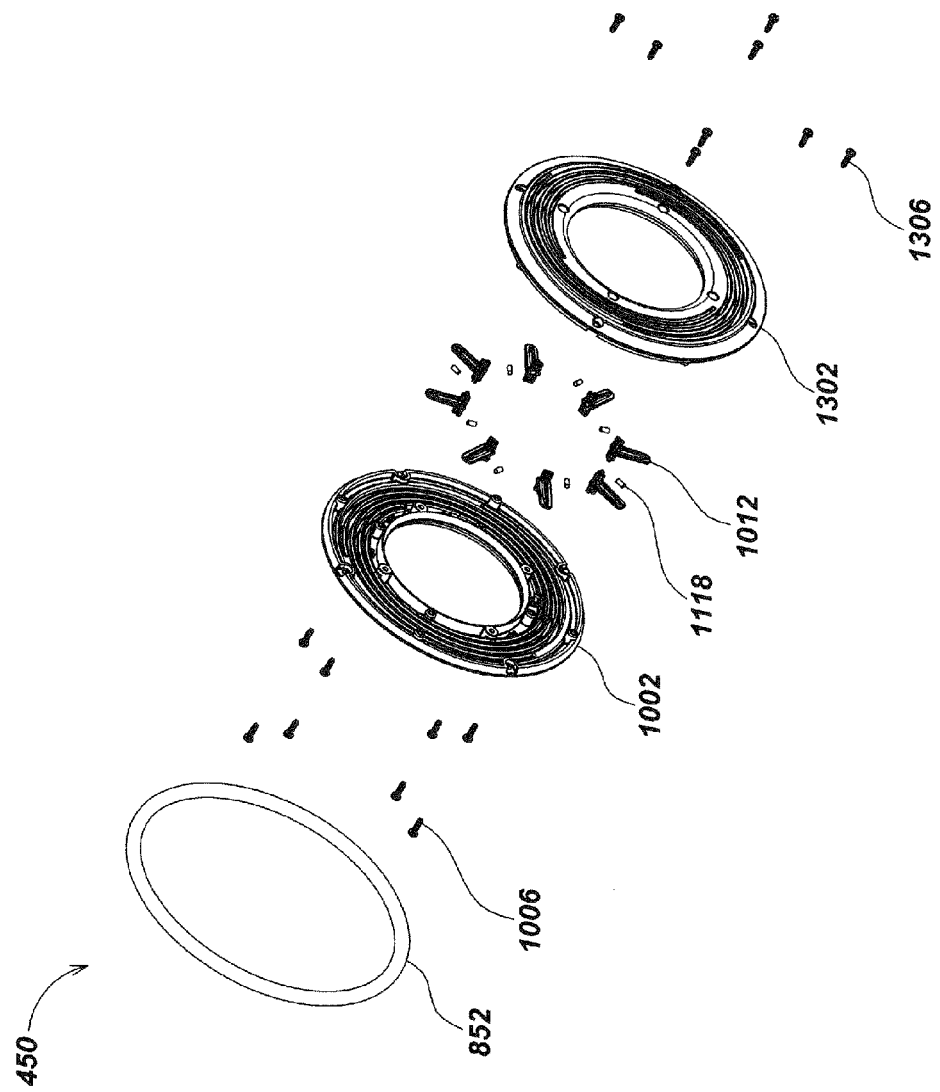
FIG. 13 is an exploded view of the left floating wheel embodiment of FIG. 12, illustrating details thereof.

FIG. 13 is an exploded view of the floating wheel 450 illustrating details thereof. In an exemplary embodiment, left floating wheel housing 1002 and right floating wheel housing 1032 may be mated and secured with left housing screws 1006 and right housing screws 1036. Magnets 1118 and gap spacers 1012 may be distributed radially in an alternating pattern (North-South), and evenly spaced from one another, within left floating wheel 450 and right floating wheel 460 (not shown in FIG. 13). In one aspect, one or more accelerometers 1416 (not shown in FIG. 13) may be disposed floating wheels, such as left floating wheel 450, and the centripetal acceleration may provide a direct measurement of the velocity.

Figure 14:
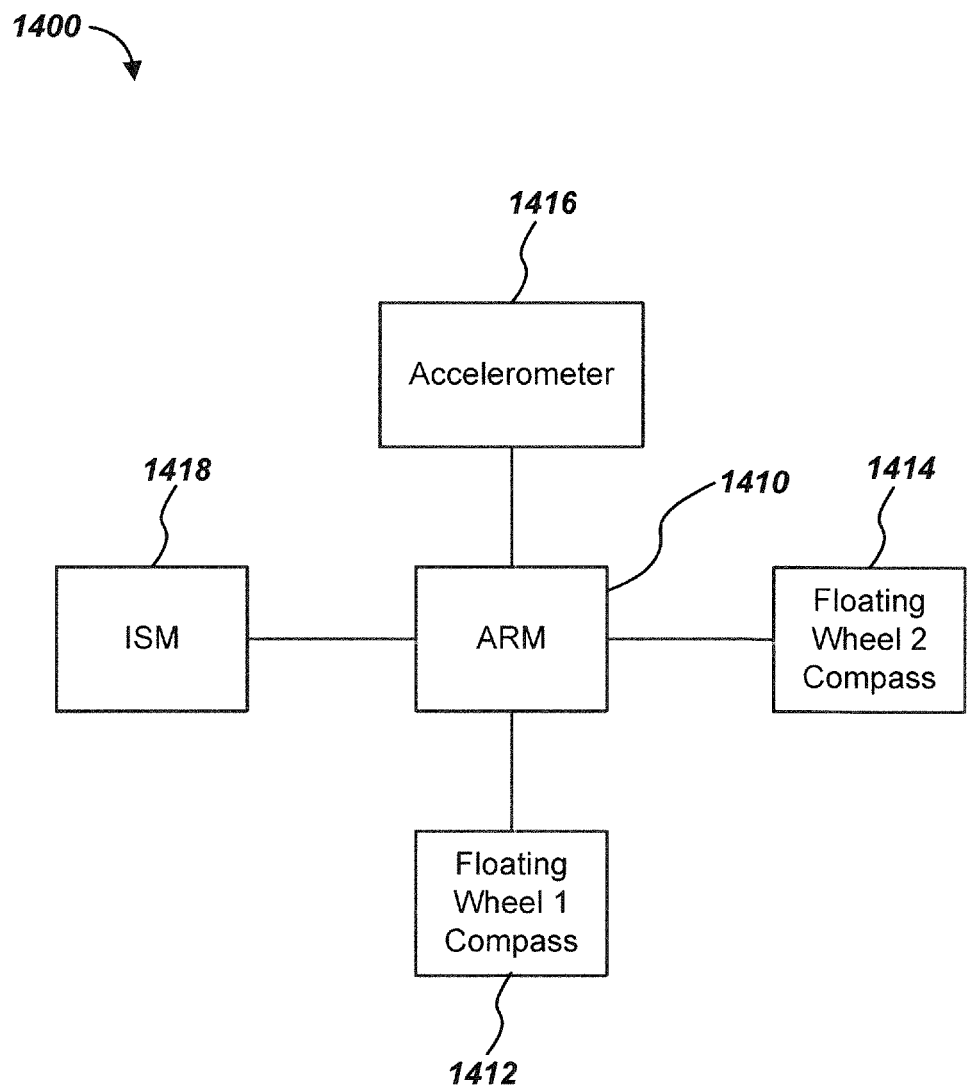
FIG. 14 is a block diagram illustrating an embodiment of a ground tracking system in accordance with aspects of the present disclosure.

FIG. 14 is a block diagram illustrating an embodiment of a ground tracking system 1400 in accordance with aspects of the present disclosure. Ground tracking system 1400 may correspond with ground tracking system 100. In the exemplary embodiment, various sensor elements may be used to detect position and/or motion about two or more axes of motion of the ground follower assembly 120, and generate signals corresponding to position and/or motion of the locator 110, relative to the surface of the ground in two or more axes or directions of motion. In one aspect, a ground tracking system 1400 may include a processor, such as an ARM processor 1410, which may include one or more sensor elements, such an accelerometer, such as a 3-axis accelerometer 1416, for sensing orientation in X, Y and Z dimensions.

In an exemplary embodiment, ground tracking system 1400 may include one or more magnetometers, such as a first floating wheel compass 1412, a second floating wheel compass 1414. An ISM radio 1418 may be used to transmit data and other information. Ground tracking system 1400 may optionally include a gyroscope, a GPS and/or a barometer.

Figure 15A:
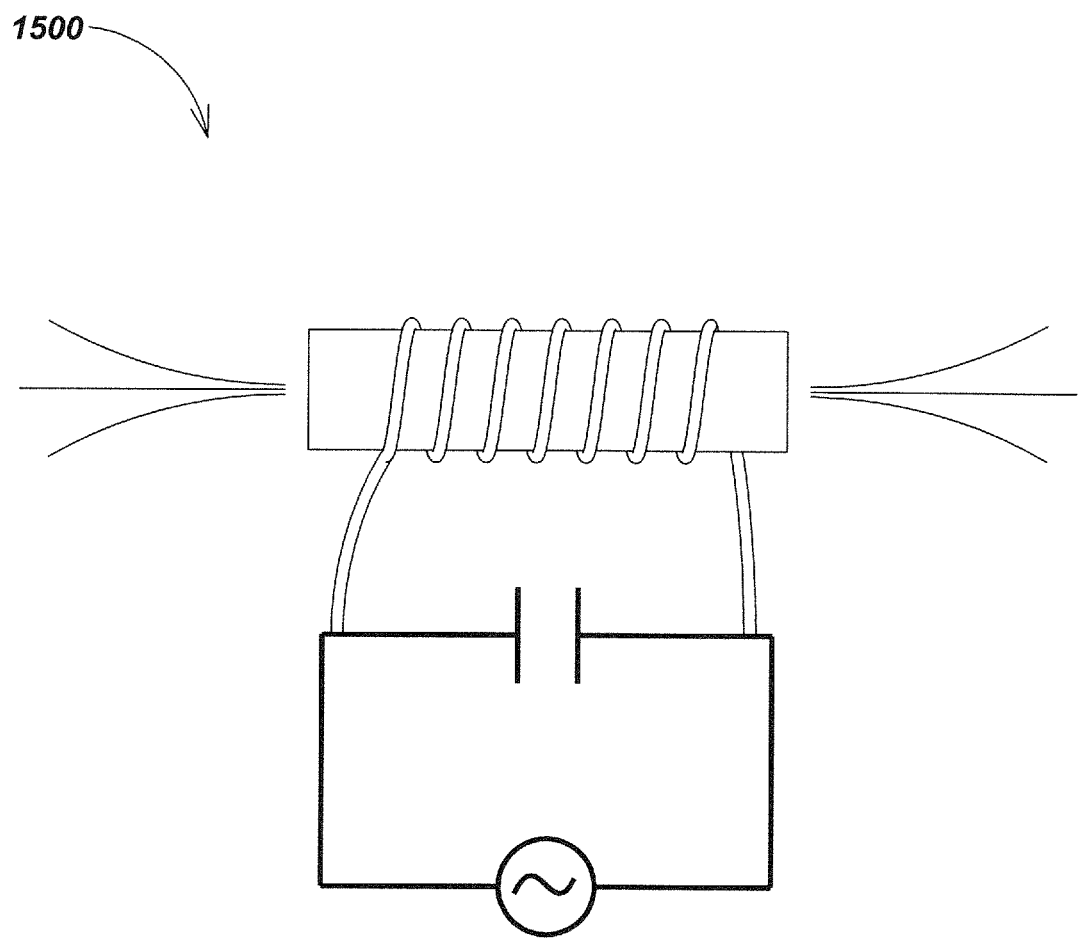
FIG. 15A illustrates an embodiment of a direct excitation circuit for inducing current in the dipole beacon(s)
Figure 15B:
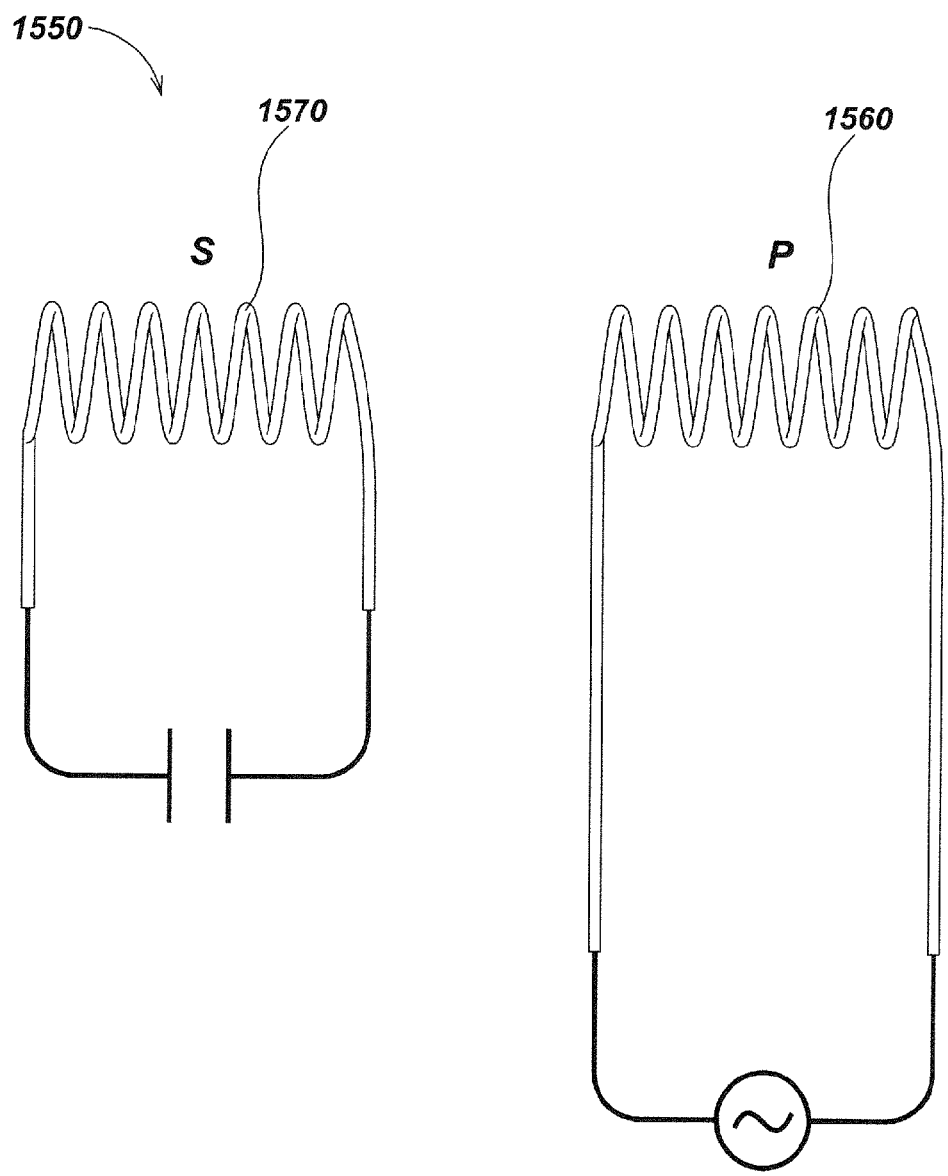
FIG. 15B illustrates an embodiment of a circuit using primary coils for inducing current in a secondary current of the dipole beacon(s)

Turning to FIGS. 15A and 15B, current may be induced onto the dipole beacons in various ways. Some embodiments may use direct excitation as illustrated in the direct excitation circuit 1500 of FIG. 15A. In other embodiments, such as illustrated in circuit 1550, a primary coil 1570 may be used to induce current into a secondary coil within the dipole beacon.

Figure 16A:
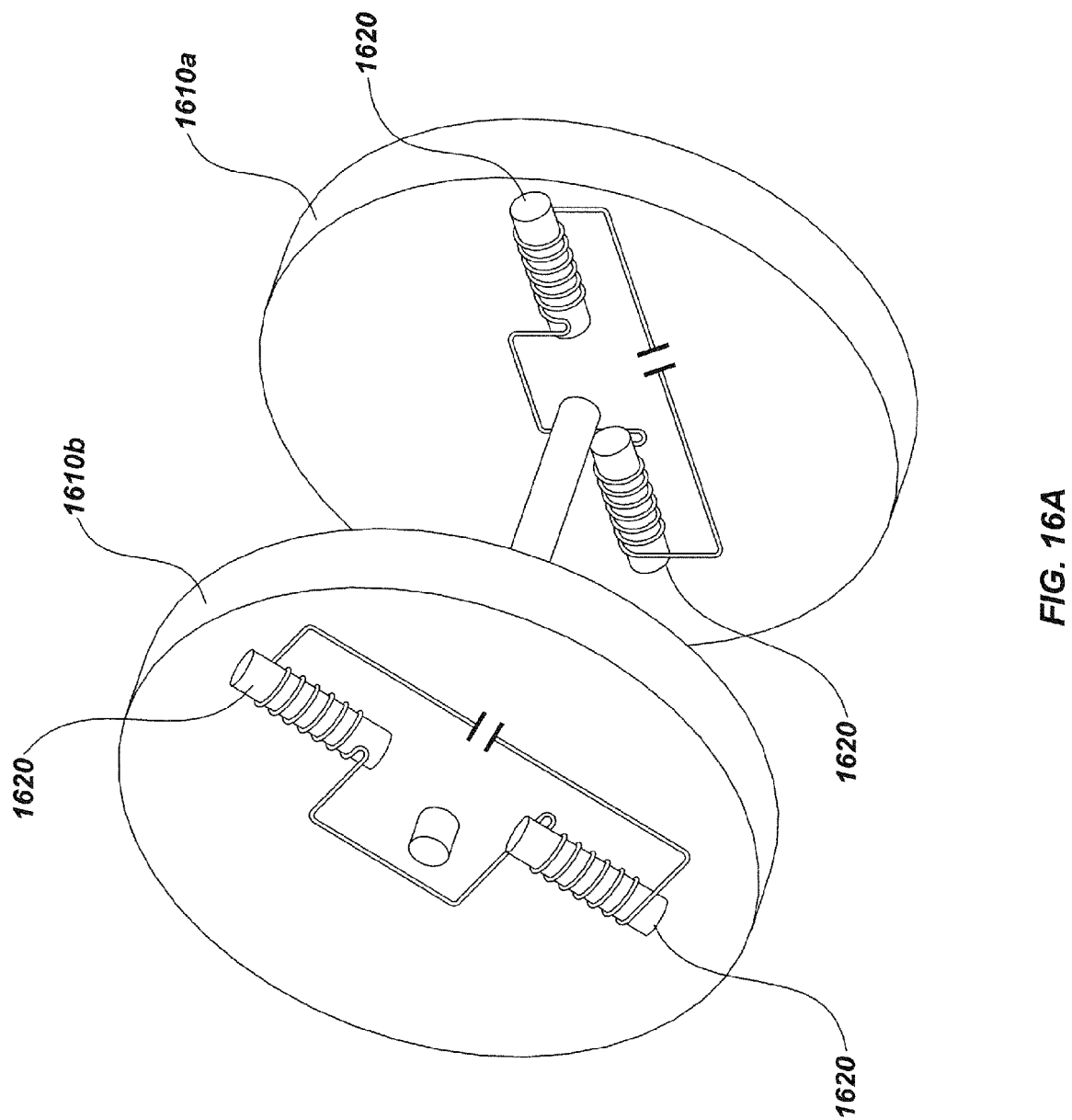
FIG. 16A illustrates an alternative dipole beacon configuration embodiment.
Figure 16B:
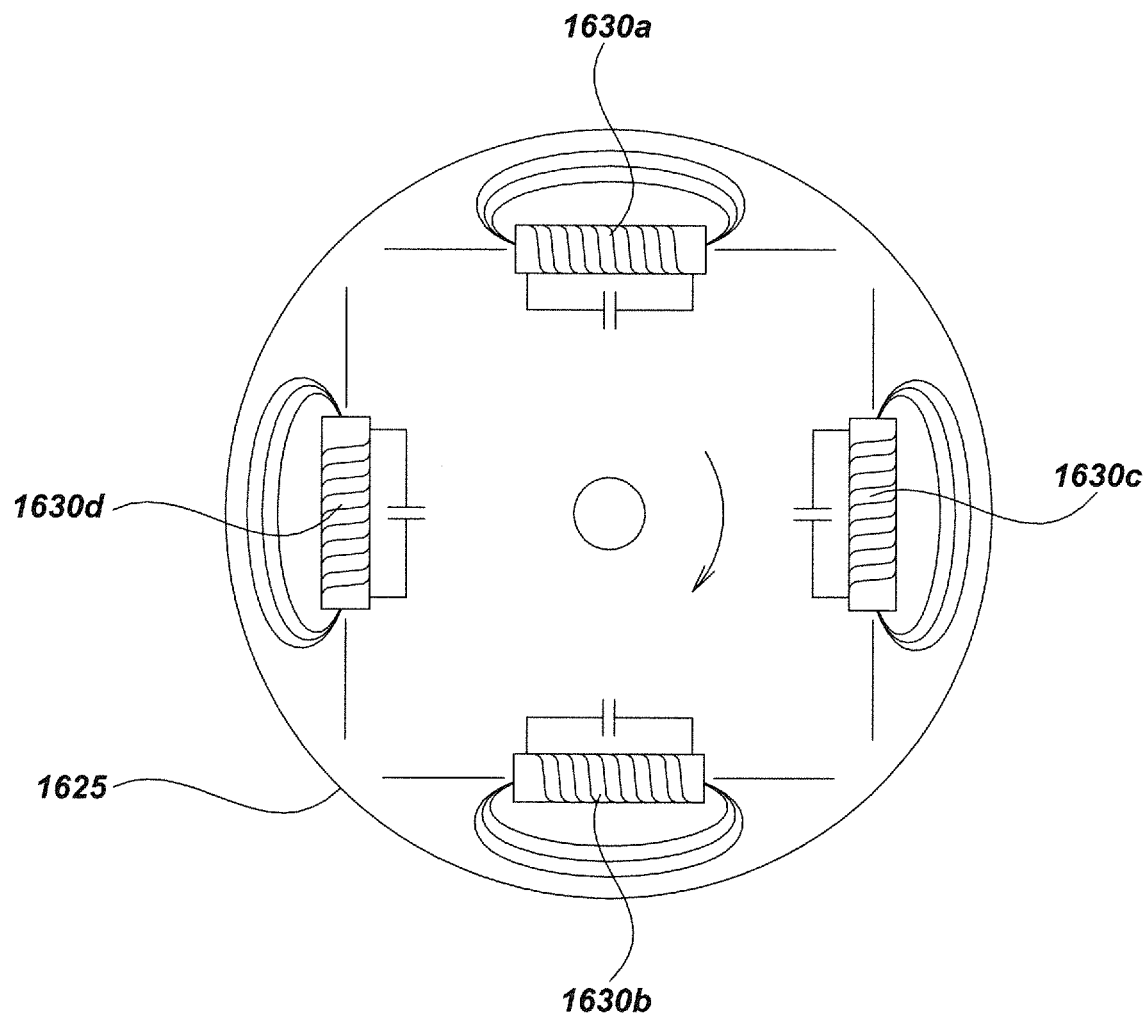
FIG. 16B illustrates an alternative dipole beacon configuration embodiment.
Figure 16C:
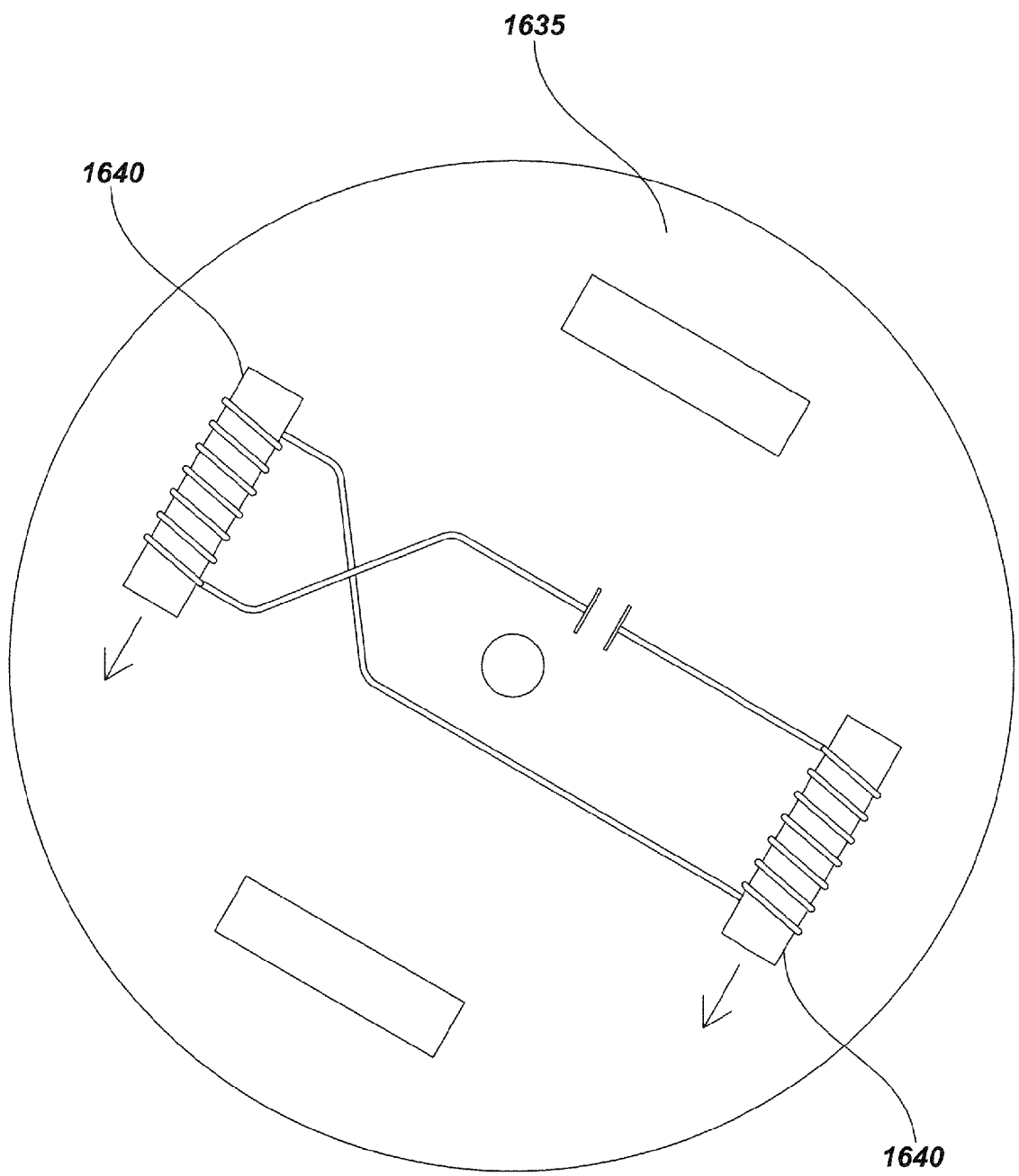
FIG. 16C illustrates an alternative dipole beacon configuration embodiment.

Turning to FIGS. 16A, 16B, and 16C, any number of beacons may be used in a number of different positions and orientations capable of operating at one or more different frequencies in various embodiments of rolling or moving elements including one or more sondes and/or sonde arrays and associated power supplies, batteries, and the like.

As illustrated in FIG. 16A, wheels, such as wheels 1610a and 1610b, of a ground tracking device wheel assembly in keeping with aspects of the present disclosure may include multiple magnetic dipole beacons or inductors such as the sondes 1620. On wheel 1610a and wheel 1610b, a pair of sondes 1620 may be positioned along the same diameter of their respective wheel such that each sonde 1620 of the sonde 1620 pair may have similarly oriented polarities. In such embodiments, such as that illustrated in FIG. 16B, each wheel of the wheels 1610a and 1610b may have differently oriented diameter to which each sonde 1620 pairing may be secured such that the combined field generated by each pair of sondes 1620 may be staggered. The combined field from each pair of sondes 1620 may appear as one field to the antenna node of a locator device.

In some embodiments the dipole beacons may be secured about different locations along a wheel oriented in directions other than aligned with the wheel's axis or radius/diameter. For instance, in FIG. 16B, a wheel 1625 may contain four dipole beacons such as sonde 1630a, 1630b, 1630c, and 1630d. In such embodiments, sonde 1630a and sonde 1630b may be oriented parallel to one another and perpendicular to the radius of wheel 1625 near the outer circumference of wheel 1625. Similarly, sonde 1630c and sonde 1630d may be oriented parallel to one another and orthogonal to the radius of wheel 1625 near the outer circumference of wheel 1625. The parallel set of sondes 1630a/160b may be oriented orthogonal to the other parallel set of sondes 1630c/d. In some embodiments, each parallel sonde pairing, such as sondes 1630a/b and sondes 1630c/d, may have dipoles with similarly oriented polarities. In other embodiments, each parallel sonde pairing, such as sondes 1630a/b and sondes 1630c/d, may have dipoles with oppositely oriented polarities. In some embodiments, each parallel sonde pairing, such as sondes 1630a/b and sondes 1630c/d, may be configured to generate the same frequency, different frequencies, or a variety of frequency that may time multiplexed as described in, for example, co-assigned U.S. Patent Application Ser. No. 61/779,830, entitled QUAD-GRADIENT COILS FOR USE IN LOCATING SYSTEMS, filed Mar. 14, 2013, U.S. patent application Ser. No. 13/676,989, entitled QUAD-GRADIENT COILS FOR USE IN LOCATING SYSTEMS, filed Nov. 14, 2012, U.S. Patent Application Ser. No. 61/781,889, entitled OMNI-UDUCER TRANSMITTING DEVICES AND METHODS, filed Mar. 14, 2013. The content of each of these applications is hereby incorporated by reference herein in its entirety for all purposes.

Turning to FIG. 16C, wheels, such as wheel 1635, of a ground tracking device in keeping with aspects of the present disclosure may contain magnetic dipole beacons such as sondes 1635. The sondes 1635 may be wired as illustrated to produce magnetic fields with similarly oriented polarities from each sonde 1635.

Figure 17A:
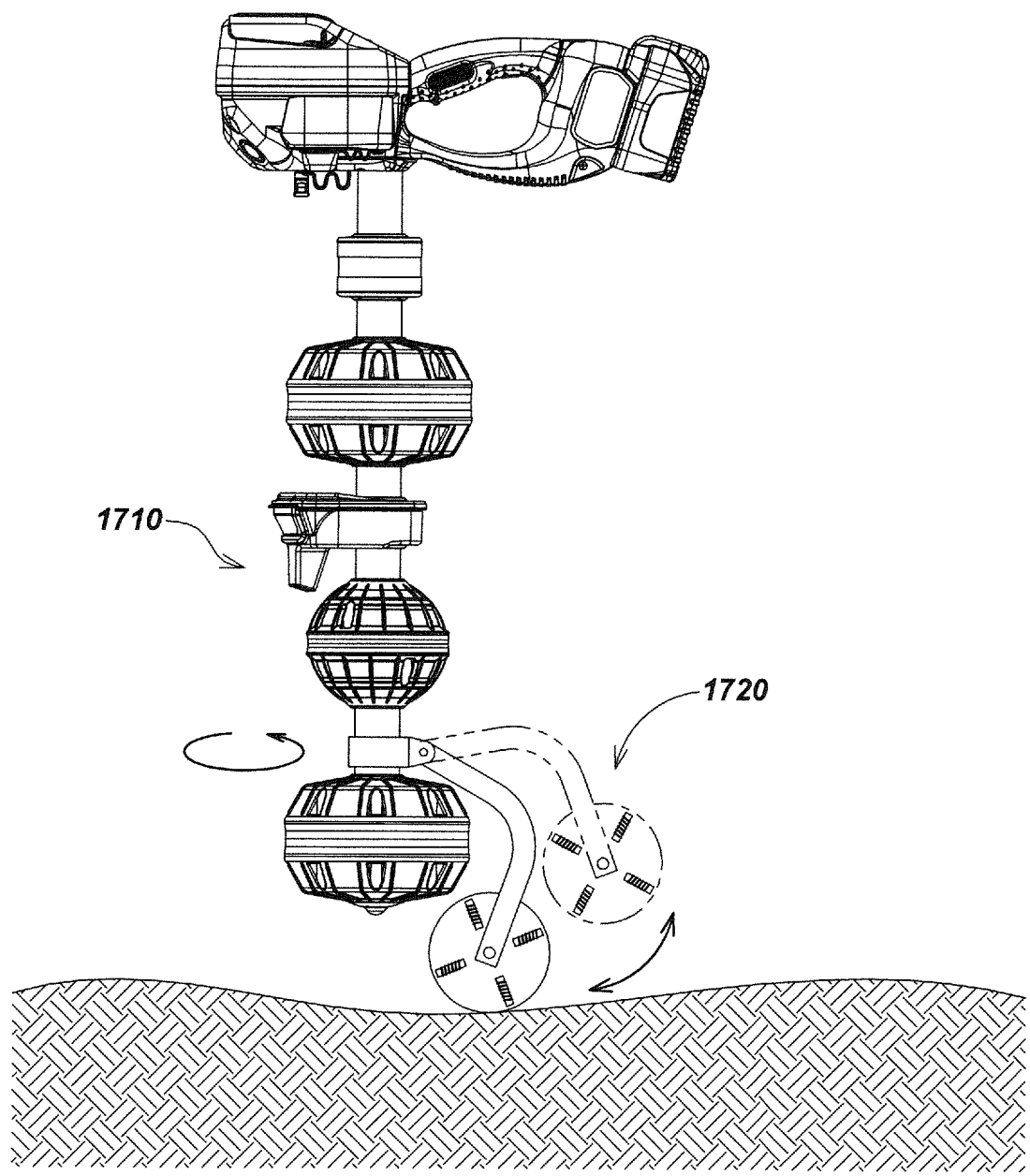
FIG. 17A illustrates a locator embodiment with an alternative ground tracking yoke structure configuration embodiment.
Figure 17B:
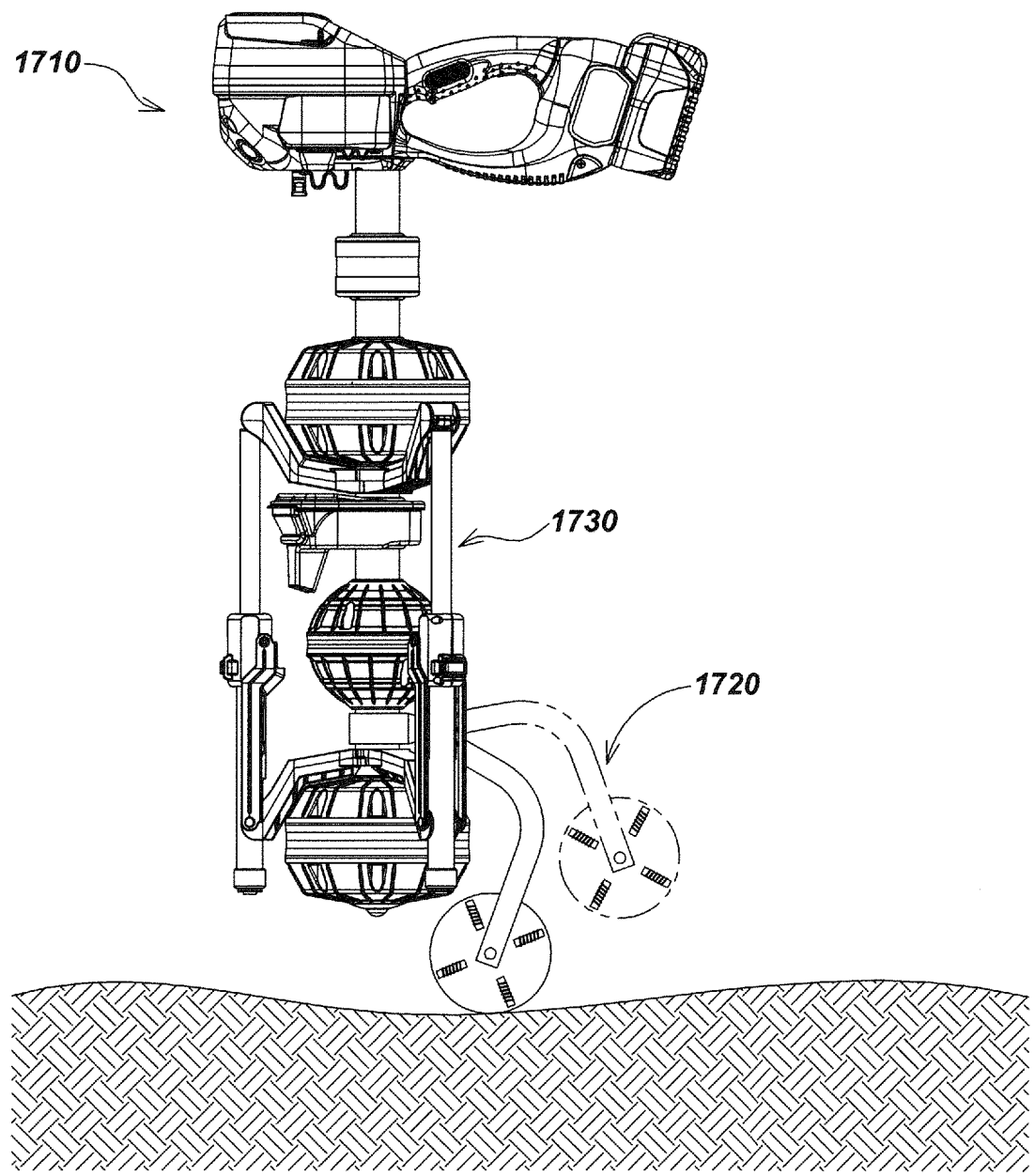
FIG. 17B illustrates the embodiment from FIG. 17A with a tripod accessory.
Figure 17C:
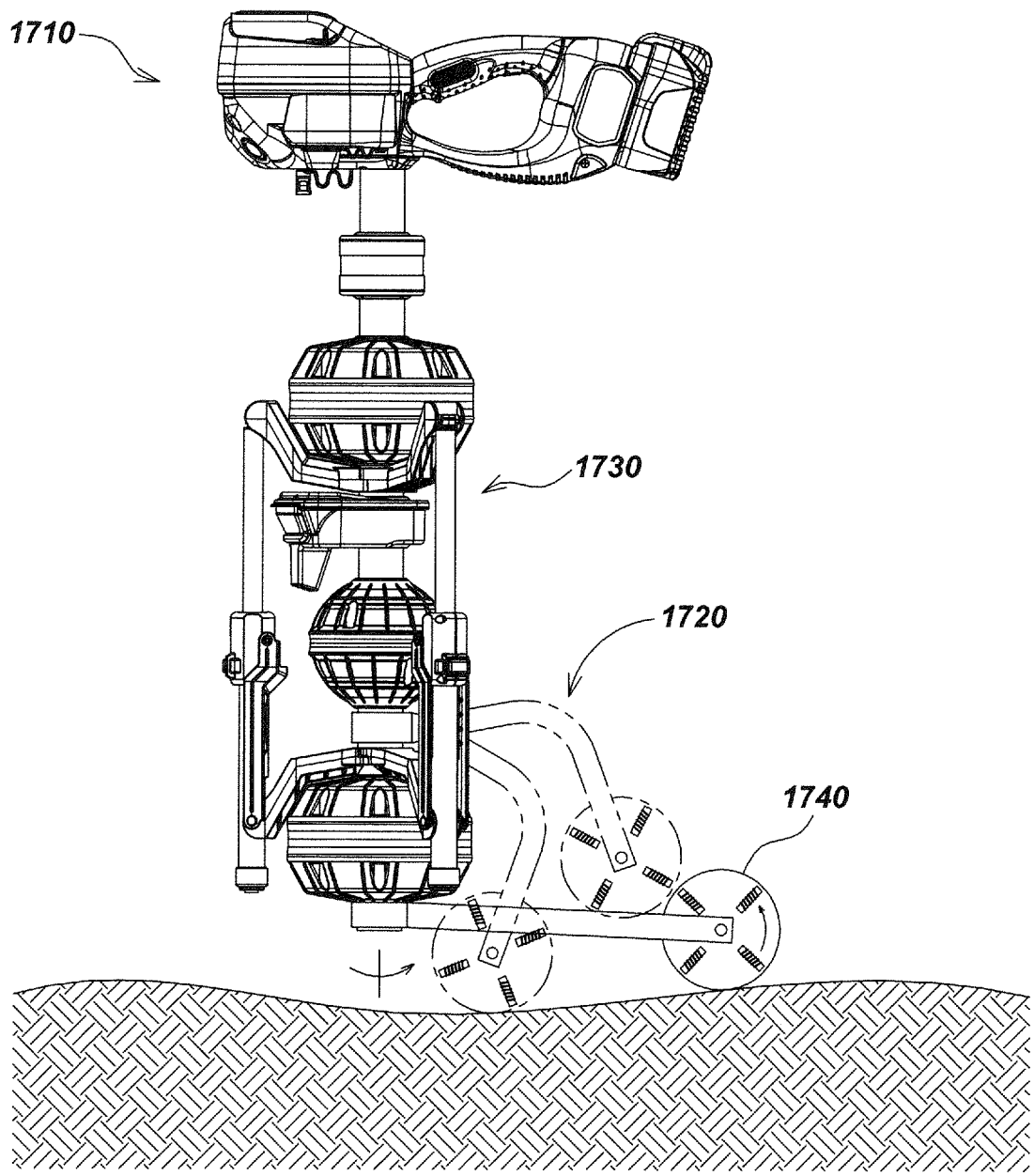
FIG. 17C illustrates the embodiment from FIG. 17B with another ground tracking yoke structure configuration.

Turning to FIGS. 17A, 17B, and 17C, a locator device may be fitted or coupled to a ground tracking device which may be secured to the locator device in ways other than by attaching to an antenna node. For instance, the ground tracking device 1720 may secure to the mast of a locator 1710. In such embodiments, the ground tracking device 1720 may be configured to rotate about the vertical axis of the mast. The ground tracking device 1720 may be further configured to pivot or swivel upward and downward to compensate for rolling about uneven terrain of the ground or operating surface as well as possible stowage of the device. As illustrated in FIGS. 17B and 17C, a tripod accessory, such as tripod attachment 1730, may be used on a locator device in conjunction with a ground tracking device such as the ground tracking device 1720. As illustrated in FIG. 17C, other embodiments of ground tracking devices, such as the ground tracking device 1740, may be used with a tripod accessory such as the tripod attachment 1730.

Figure 18:
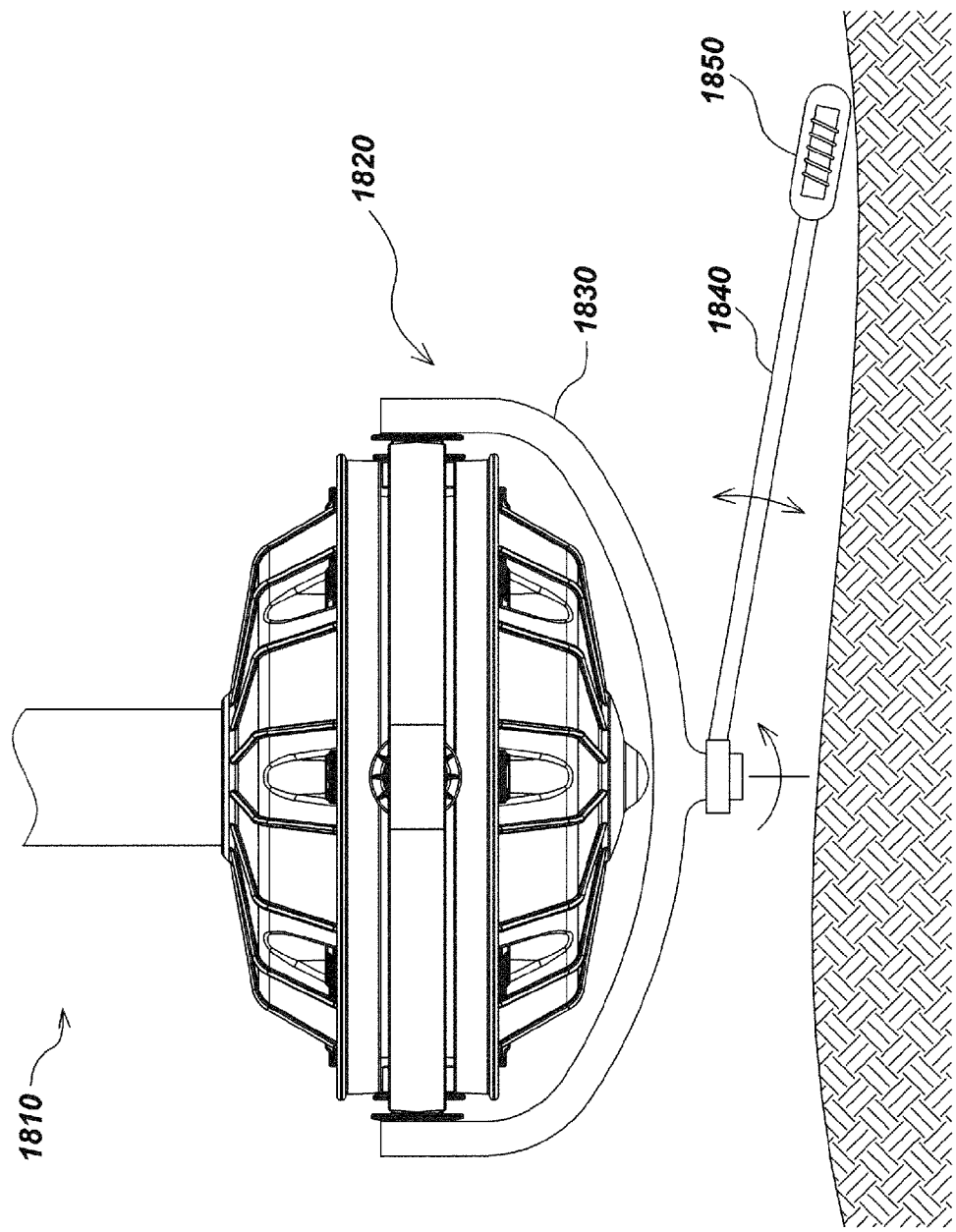
FIG. 18 illustrates a dragging dipole beacon embodiment.

Turning to FIG. 18, an antenna node of a locator 1810 may be fitted or coupled to a dragging dipole beacon such as shown in embodiment 1820. In the embodiment 1820, a yolk assembly 1830 may secure about an antenna node while a connected arm 1840 with a sonde 1850 positioned about its end may be configured to drag along the ground or operating surface. The arm 1840 may be configured to rotate about the vertical axis of the locator 1810 mast. The arm 1840 may further be pliant allowing it to move up and down along the operating surface as well as twist.

Figure 19A:
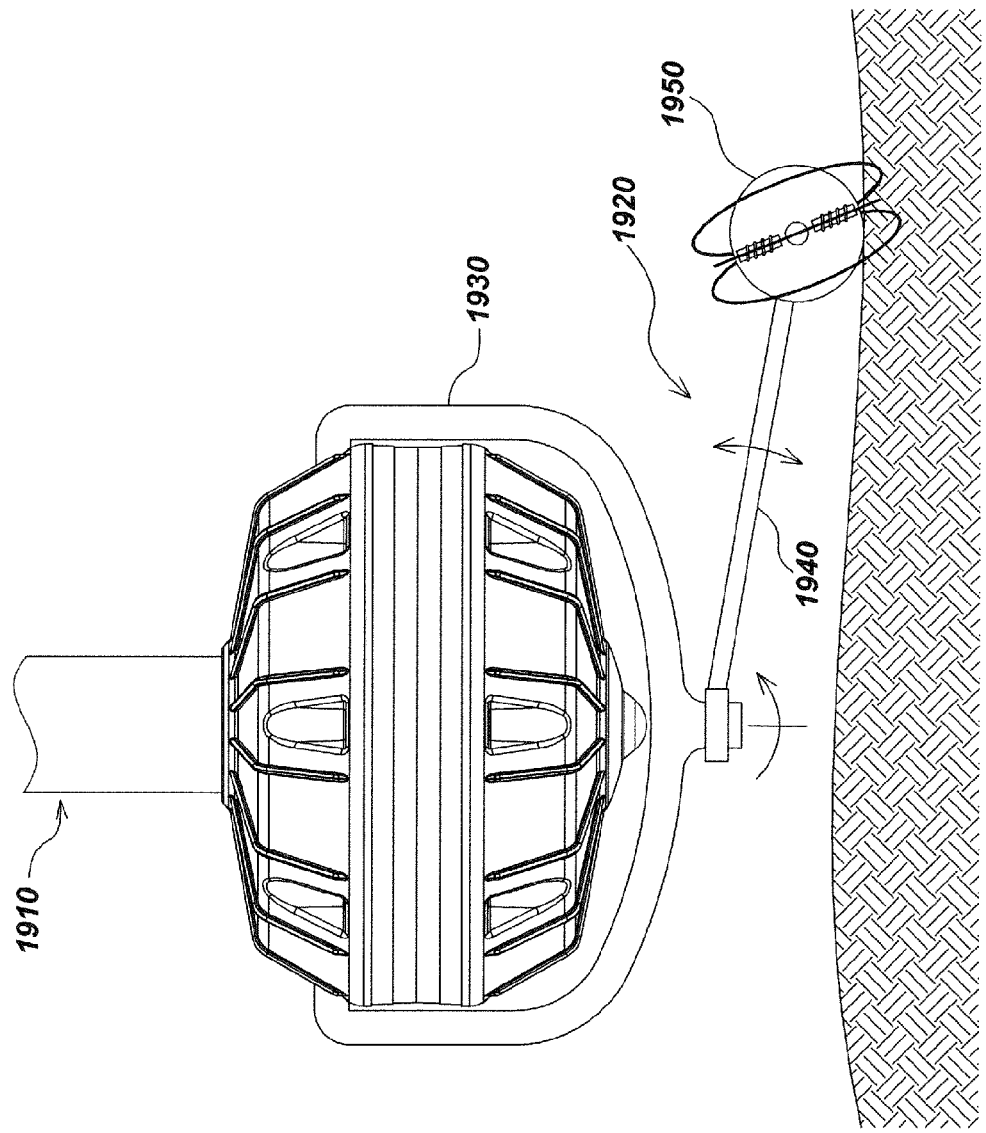
FIG. 19A is an illustration of a snap on dipole beacon embodiment.
Figure 19B:
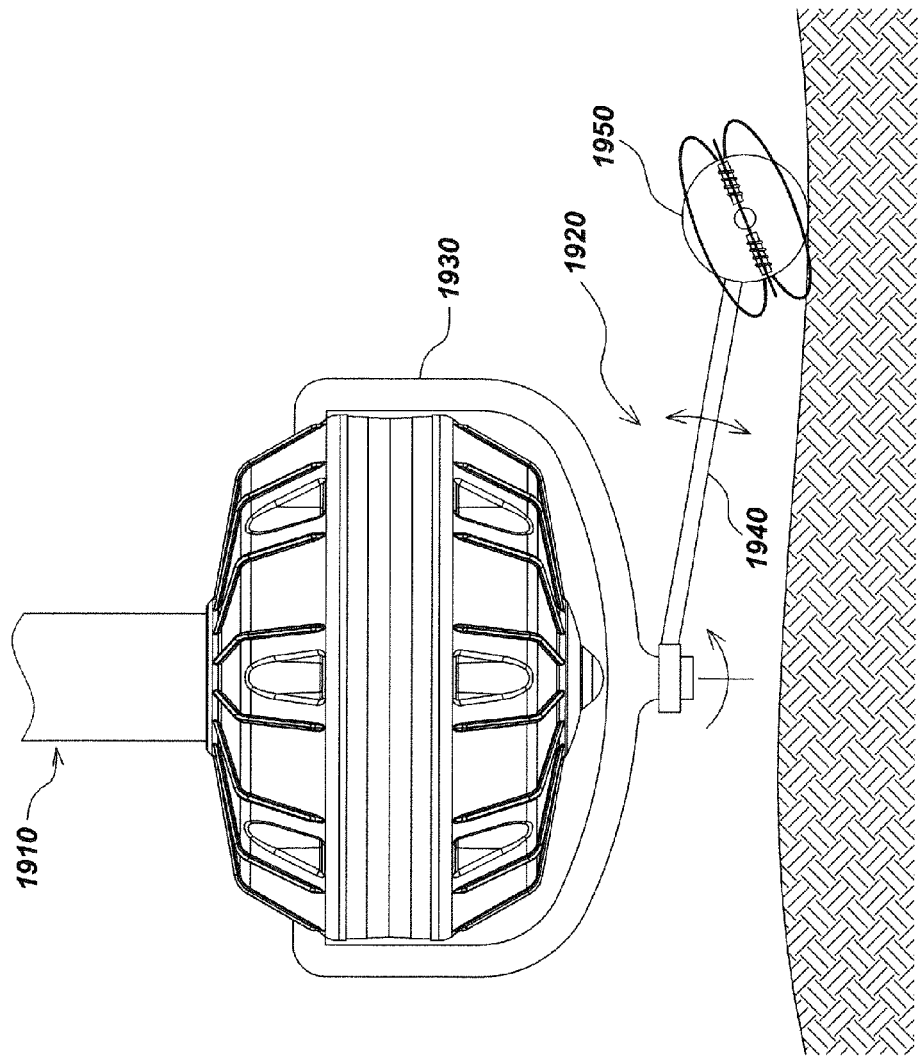
FIG. 19B illustrates the embodiment from FIG. 19A with the beacon rotated as it may move across the ground or operating surface.
Figure 19C:
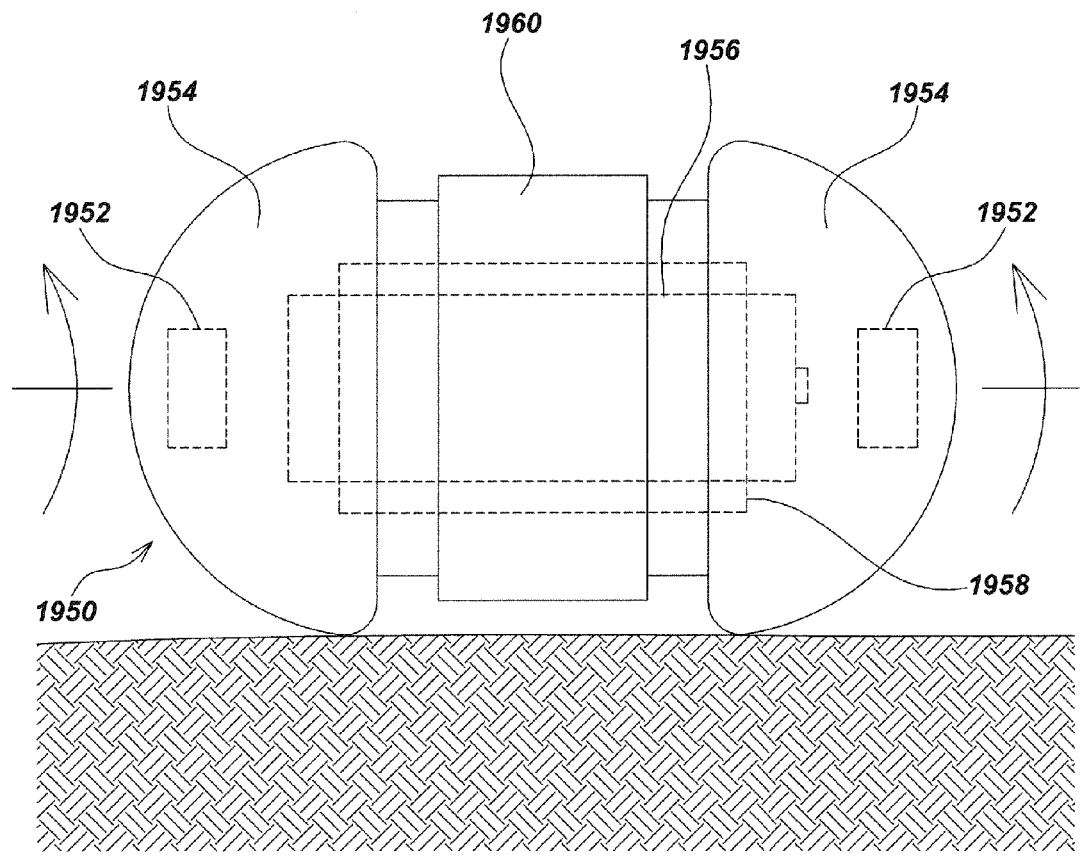
FIG. 19C illustrates the beacon embodiment from FIG. 19A in detail.

Turning to FIGS. 19A-19C, an antenna node of a locator 1910 may be fitted with a dipole beacon embodiment 1920. In the embodiment 1820, a yolk assembly 1930 may secure about an antenna node while a connected arm 1940 with a sonde wheel assembly 1950 positioned about its end may be configured to be wheeled along the ground or operating surface. The arm 1940 may be configured to rotate about the vertical axis of the locator 1910 mast. The arm 1940 may further be pliant allowing it to move up and down along the operating surface as well as twist. As illustrated in FIG. 19C the sonde wheel assembly 1950 may include one or more vertical dipole beacons in a sonde array such as the vertical sondes 1952, secured to or within each of the wheels 1954, a battery 1956, and a horizontal sonde 1958 incased within a housing 1960. The wheels 1954 may be configured to rotated independently of each other. Some embodiments may use two wheels in a wheel assembly, wherein each wheel may include one or more sondes. In some embodiments, each wheel may include a sonde array of two or more sondes, which may be oriented in different positions an/or axis dimensions on the wheel, such as in two or more orthogonal axes. Some embodiments may use two wheels in a wheel assembly, while others may use three or more wheels in a wheel assembly. The wheels in assemblies with two or more wheels may be further configured to be axially displaced relative to each other. This may be done to alloy each wheel to track a surface contour, such as shown in FIG. 4, while sending signals from one or more sondes in each of the wheels. These sonde signals may be received by a corresponding locator and used to generate additional information associated with the ground surface, such as contour information. On level surfaces, information may be determined in the locator or other device based on signals provided from sondes in multiple wheels when the wheel assembly is rotated about a vertical or other axis of the locator, such as when the locator is swept around in a circle or other arcs about a point or line.

Figure 20A:
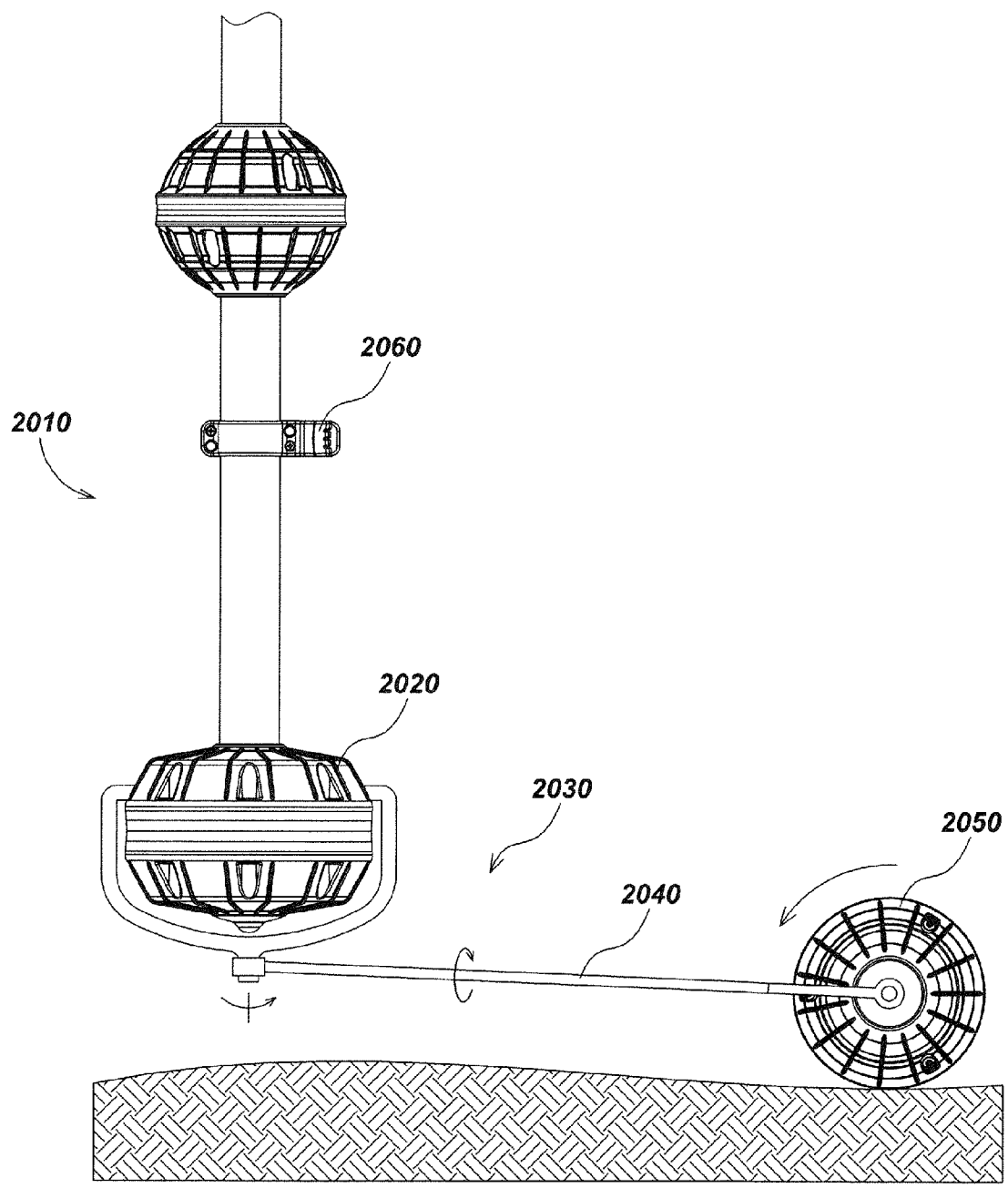
FIG. 20A is an illustration of an omni-directional inducer wheel embodiment connected to a locator device.
Figure 20B:
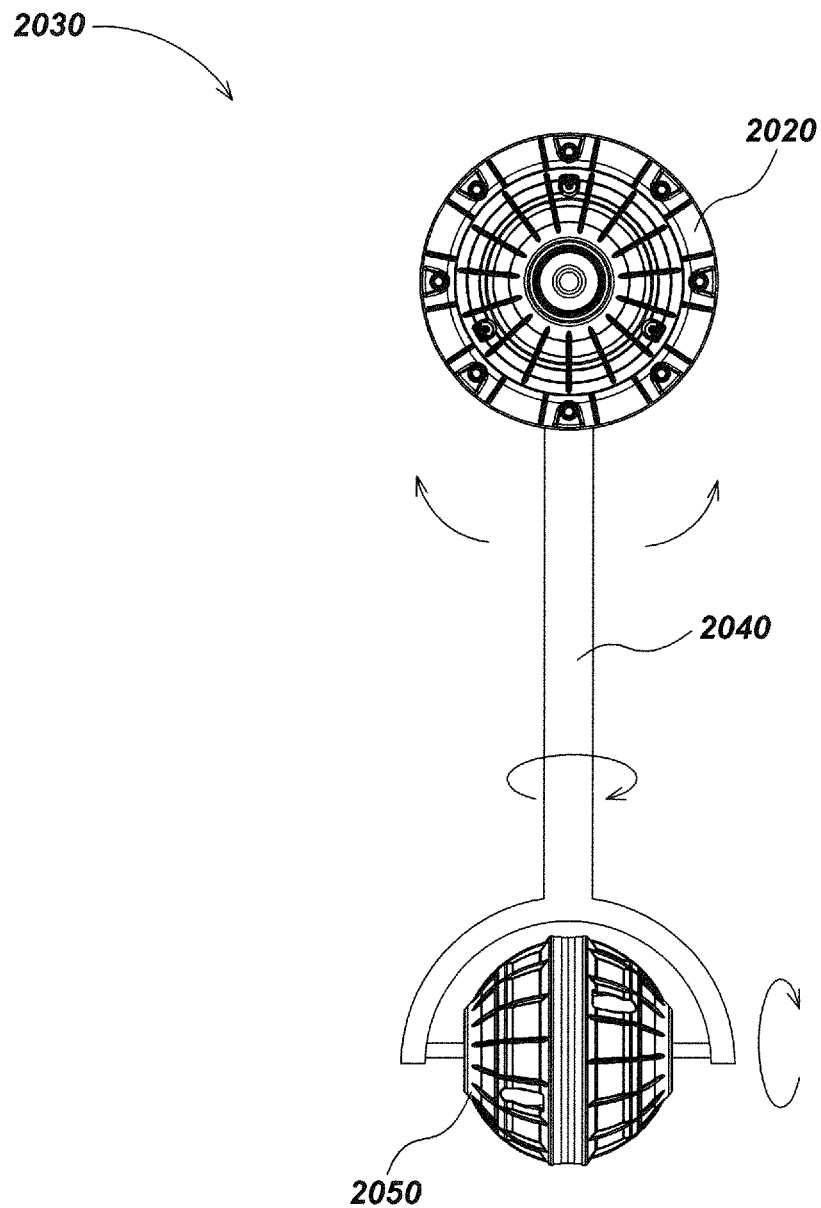
FIG. 20B is an illustration of the embodiment from FIG. 20A from a below perspective.
Figure 20C:
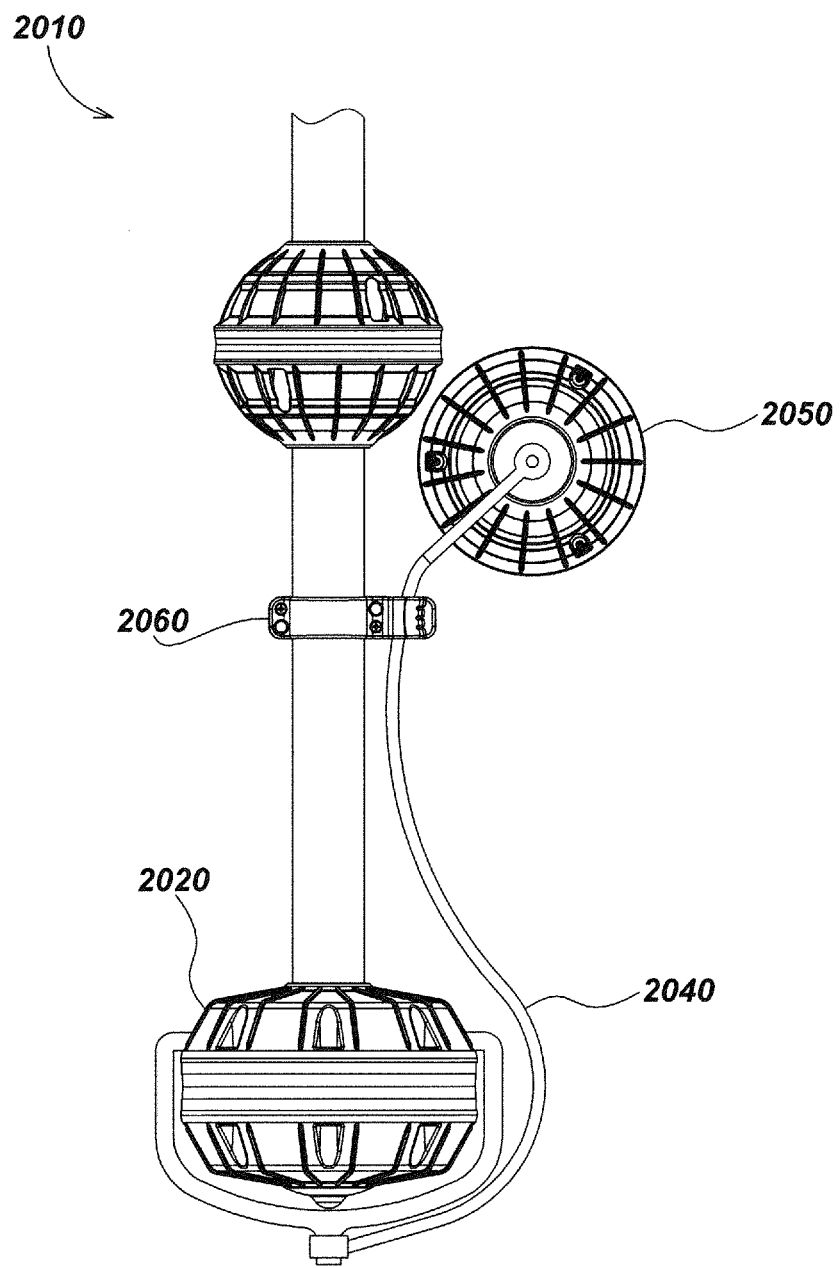
FIG. 20C is an illustration of the embodiment from FIG. 20A demonstrating the use of a stowage clip.

Turning to FIGS. 20A-20E, a locator 2010 with lower antenna node 2020 may be configured to allow an omni-inducer and ground tracking embodiment 2030 to secure to the lower antenna node 2020. The ground tracking embodiment 2030 may snap on to secure to the lower antenna node 2020. The ground tracking embodiment 2030 may have an arm 2040 may be pliant allowing it to move up and down along the operating surface as well as twist. The arm 2040 may be configured to rotate about the vertical axis of the locator 2010 mast. An omni-directional inducer wheel 2050 may secure about the end of the arm 2040 and be configured to rotate along the ground or operating surface when in use. The ground tracking embodiment 2030 may be stowed out of the way when not in use through the stowage clip 2060 as illustrated in FIG. 20C.

Figure 20D:
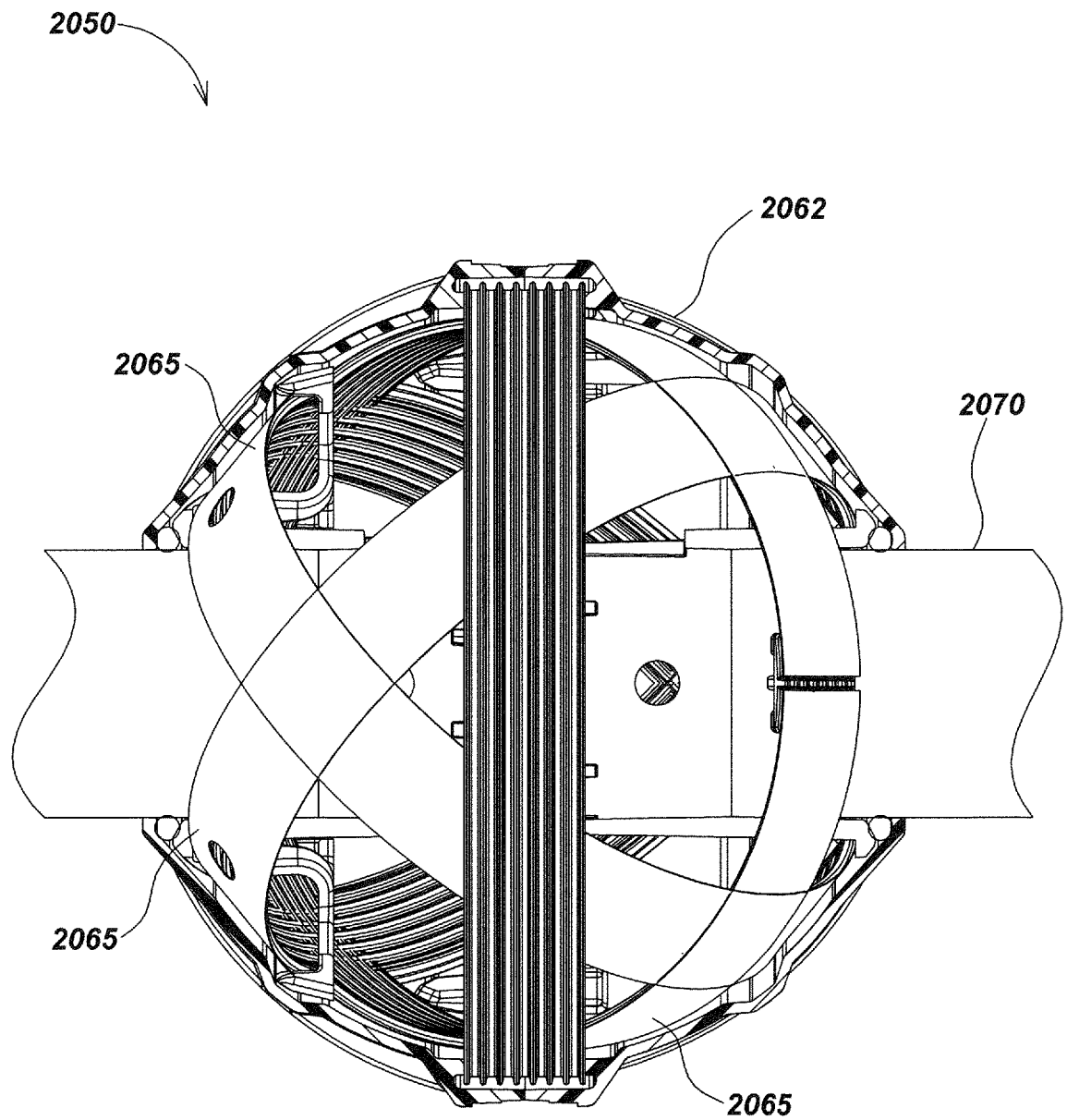
FIG. 20D is an illustration of an omni-inducer wheel embodiment.

As illustrated in FIG. 20D, the omni-inducer wheel 2050 may include a housing 260 that may house a series of antenna coils 265 in an omni-directional antenna configuration as described in, for example, co-assigned U.S. Pat. No. 8,035,390, entitled OMNIDIRECTIONAL SONDE AND LINE LOCATOR, issued Oct. 9, 2002, the content of which is incorporated by reference herein. An axle 2070 may pass through the center of the omni-inducer wheel 2050 and secure to the arm 2040 in a manner allowing the omni-inducer wheel

Figure 20E:
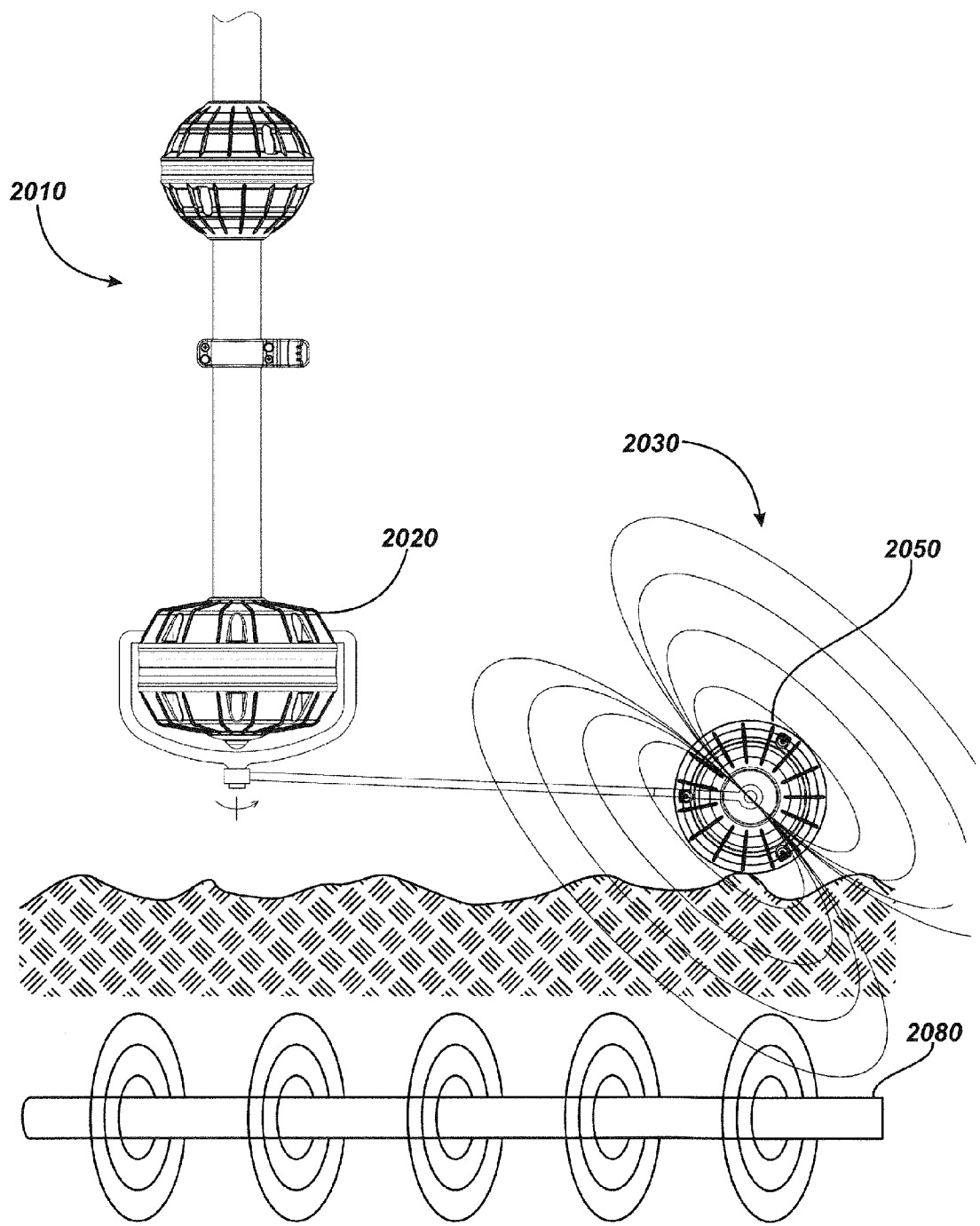
FIG. 20E is an illustration of the embodiment from FIG. 20A in use.

2050 to rotate along the ground or operating surface when in use. The device may further include enabling circuitry and power source, such as a battery. As illustrated in FIG. 20E, the omni-inducer wheel 2050 of the omni-inducer and ground tracking embodiment 2010 may be further configured to induce currents onto conductors, such as buried conductive pipes or cables, such as the line 2080, in one or more directions. In such applications where a transmitter may be needed to locate a buried utility, such an embodiment may be used instead to induce currents onto the utilities/conductors. Example teachings of inducing current in an underground utility or other conductors may be found, for example, co-assigned U.S. Patent Application Ser. No. 61/781,889, entitled OMNI-INDUCER TRANSMITTING DEVICES AND METHODS, filed Mar. 14, 2013 the content of which is hereby incorporated by reference herein. The omni-inducer and ground tracking embodiment 2010 may further be configured to sense and measure displacements of the omni-inducer wheel 2050 as described previously herein.

Figure 21:
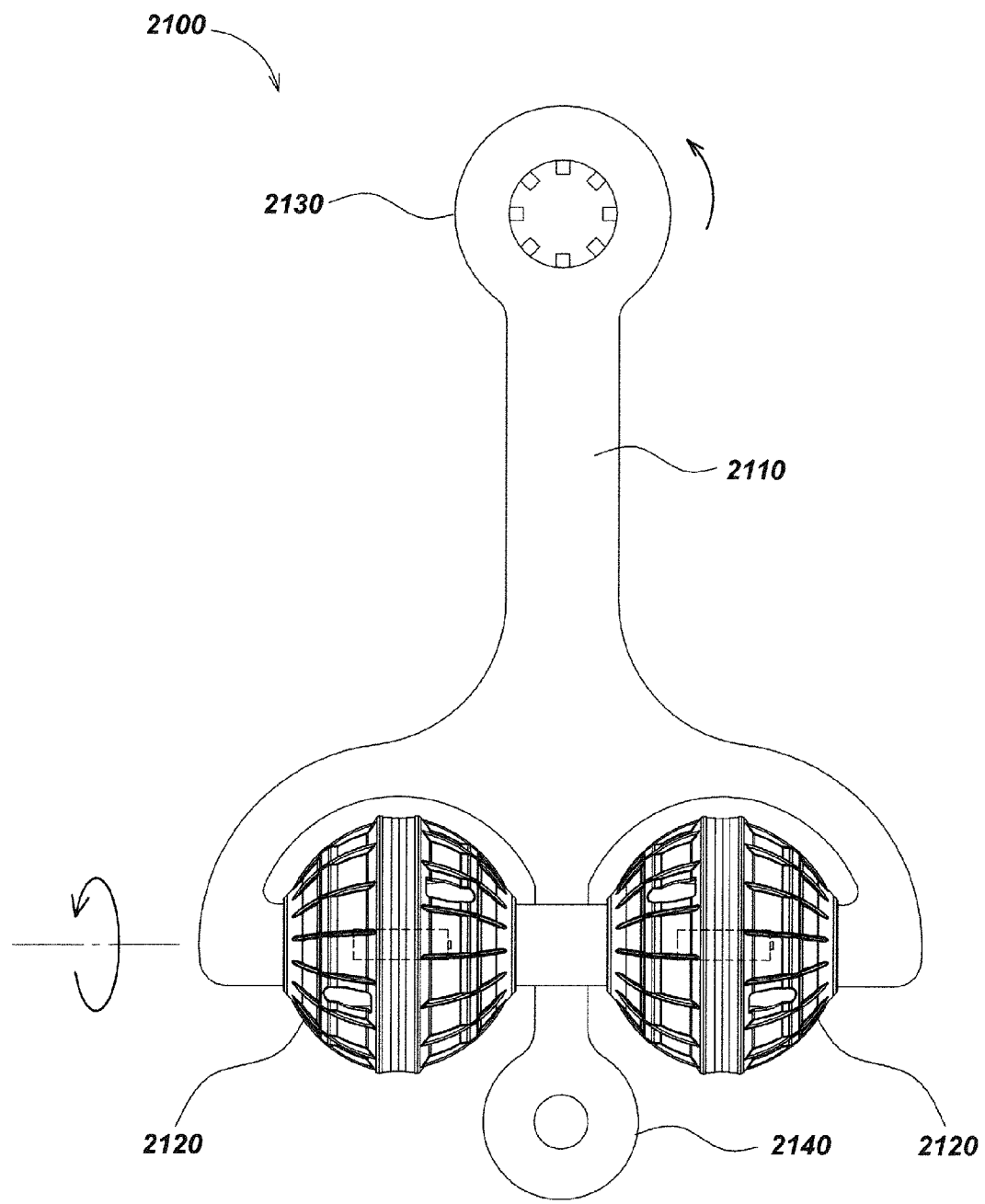
FIG. 21 is an illustration of an alternative omni-inducer wheel embodiment with multiple omni-inducer wheel assemblies.

Turning to FIG. 21, a paired omni-inducer and ground tracking embodiment 2100 may be similar to the omni-inducer and ground tracking embodiment 2030 of FIG. 20 except with multiple omni-directional inducer wheels 2120 similar to the omni-directional inducer wheel 2050 of FIG. 20. The embodiment 2100 may have an arm 2110 that may be configured to rotate about the vertical axis of a locator mast. Two omni-directional inducer wheels 2120 may secure about the end of the arm 2110 and be configured to rotate along the ground or operating surface when in use. The arm 2110 may be pliant allowing it to move up and down along the operating surface as well as twist. The arm 2110 may further snap onto the bottom of a locator device through a snap on feature 2130. The omni-directional inducer wheels 2120 may, for instance, be powered by internal batteries, such as internal rechargeable batteries or replaceable batteries, which may be accessed via a door or other panel or cover. In some such embodiments, an inductive clamp or charger may be used to recharge internal batteries, such as a commercially available 18650 battery. In other embodiments, the omni-directional inducer wheels 2120 may utilize standard sized disposable batteries. The embodiment 2110 may be stowed out of the way when not in use through the use of a stow hook 2140.

The ground tracking embodiments in keeping with the present disclosure as described in the various preceding paragraphs need not be connected to a locator device, but may be used in conjunction with other devices or systems where tracking of movement, position, or location may be needed or desirable. In addition, in locators or other devices, motion, position, orientation, or tracking information as may be generated from sonde signals may be associated with or combined with other location or positional information, such as from inertial sensors, accelerometers, compass sensors, GPS modules, or other satellite or ground-based positioning signals or systems from networks such as cellular networks and the like. These additional signals may be used to refine location or position information in conjunction with the information provided from sonde-based signaling or to cross-check or calibrate positional information from multiple information sources in various embodiments.

Figure 22:
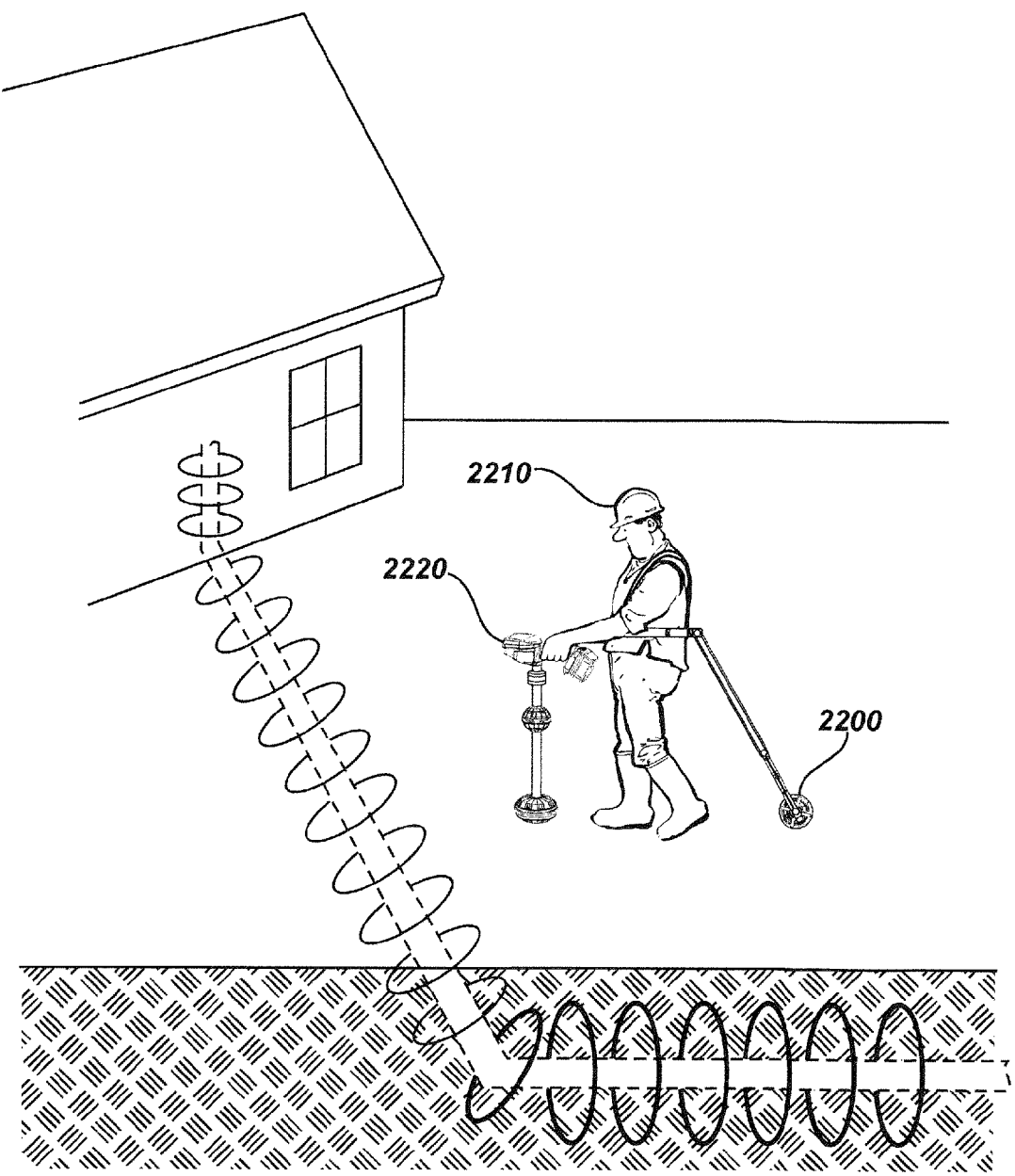
FIG. 22 is an illustration of an alternate ground tracking embodiment that may be attached to or carried by a user.

Turning to FIG. 22, a ground tracking embodiment in keeping with aspects of the present disclosure, such as the ground tracking embodiment 2200, may be configured to attach to/or be carried by a user 2210. In such embodiments, the user 2210 may hold and operate a locator 2220 at the same time.

Figure 23:
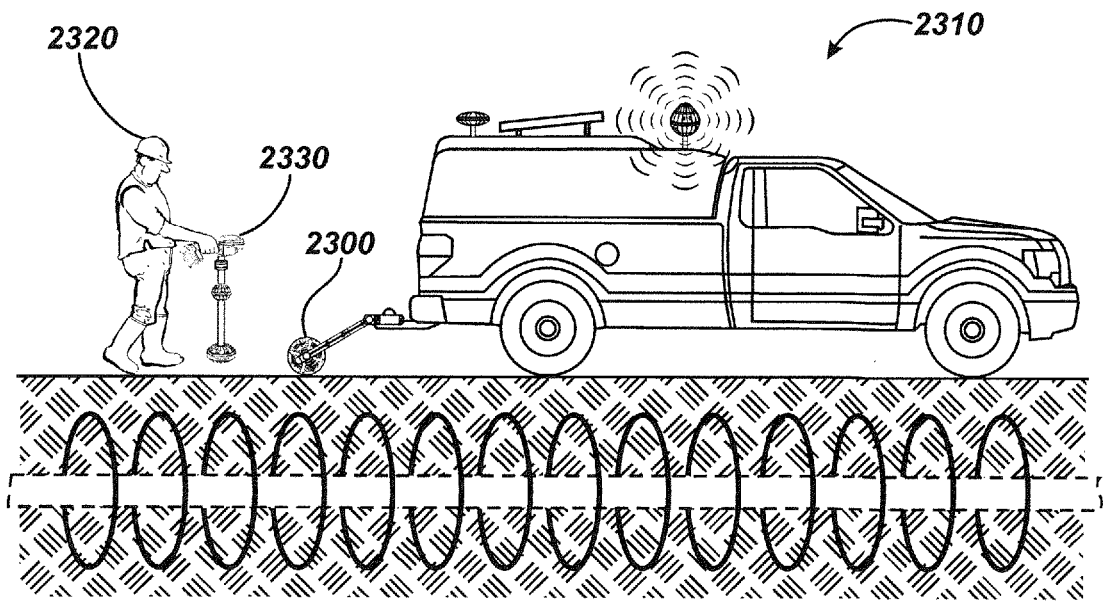
FIG. 23 is an illustration of an alternate ground tracking embodiment that may be attached to a vehicle.

Turning to FIG. 23, a ground tracking embodiment in keeping with aspects of the present disclosure, such as the ground tracking embodiment 2300, may be configured to attach to a vehicle 2310. In such cases, one or more additional instrumentation devices, sensors, and/or devices may be used as well. Examples of such instruments, sensors, and other devices may be found in, for example, the disclosures of co-assigned U.S. Patent Application Ser. No. 61/781,889, entitled OMNI-INDUCER TRANSMITTING DEVICES AND METHODS, filed Mar. 14, 2013, the content of which is incorporated by reference herein. In such embodiments, a user 2320 with a locator 2330 may follow after, lead, or walk beside the vehicle 2310 during use.

In some embodiments, accelerometers or other motion sensors may included in wheel assemblies or incorporated in or coupled to sondes or sonde arrays in conjunction with circuit for awakening or powering up a ground tracking device in keeping with the present disclosure. For example, such sensors may be used to wake the device from a sleeping state or low powered or powered down state.

In various embodiments, the sensed motion signals may be processed in whole, or in part by the measurement circuit, with processed data or information sent to the locator 110. Sensed motion signals may optionally be processed in the locator 110. In one aspect, sensed motion signals may be used to calculate and map position, motion, location, orientation, and/or terrain data or information associated with movements of locator 110 by operator 102.

Signals provided from the ground tracking system 1400 may be combined or processed in combination with additional signals provided from the locator 110 to generate the position and/or movement data as well as to generate mapping data for the locating or tracing operation. For example, accelerometer or other motion sensing devices in a locator may be combined with motion signals from the ground follower assembly 120 to distinguish relative movements associated with the locator from movements generated by sensors in the ground tracking device. This can be used to generate more complete mapping data reflecting position and movements of the ground tracking system 1400. The data may be stored in the ground follower device 120 or locator 110 or other instrument for subsequent download and/or processing.

In an exemplary embodiment, the sensors may comprise magnetic sensors and associated permanent magnets to generate position and/or motion signals. However, in some embodiments, optical encoders, potentiometers, gyroscopic devices, compass devices, and/or other sensor elements and associated hardware and signal processing circuits may be used to sense relative position and motion, and other information.

Various example embodiments have been described previously herein to provide ground tracking devices that may be coupled to a locator or other measurement device. The ground tracking devices may be configured with a ground follower assembly, which may use an element such as one or more wheels, a sphere, or other mechanisms to follow the ground or other surfaces and provide sensed motion signals in multiple axes or dimensions. The motion signals may be processed in a processing circuit of the ground follower assembly to filter, correlate, generate motion and/or position data, and/or integrate the motion signals with other sensor data or information. The motion signals may be provided, either as raw signals or processed signals or data to the attached measurement device for further processing and/or data storage. Other combinations of the various aspects, elements, components, features, and/or functions described previously herein may be combined in various configurations.

In addition, details regarding additional aspects, elements, components, features, functions, apparatus, and/or methods which may be used in conjunction with the embodiments described previously herein in various implementations are described in the related applications of the assignee of the instant application.

In some configurations, the devices, elements, mechanisms, or apparatus may include means for performing various functions as described herein, such as are illustrated in the appended drawing figures. The aforementioned means may be, for example, mechanical elements such as wheels or other ground follower elements, sensor elements, processor or processors and associated memory in which embodiments reside, such as in processing elements, on circuit boards or substrates, or in other electronic configurations perform the functions recited by the aforementioned means. The aforementioned means may include a non-transitory storage medium including instructions for use by a processor to implement, in whole or in part, the various sensing and measurement functions described previously herein. In another aspect, the aforementioned means may be a module or apparatus configured to perform the functions recited by the aforementioned means.

In one or more exemplary embodiments, the various data collection, measurement, storage and signal processing functions, methods and processes described herein and/or in the related applications may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any accompanying process or method claims present elements of the various steps in a sample order, however, this is not meant to be limiting unless specifically noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. In some embodiments mechanical elements and functions, such as ground follower assemblies, yoke assemblies, or other mechanical elements may be replaced, in whole or in part, by other elements, such as acoustic or optical elements. For example, in some embodiments, some or all of the mechanical elements of a ground follower assembly as described previously herein may include acoustic and/or optical ground movement detection elements in place of or in addition to mechanical elements such as wheels and yokes.

The various illustrative logical blocks, modules, and circuits described in connection with the embodiments disclosed herein may be implemented or performed in a processing element or other circuit with a general purpose processor, special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the present invention is not intended to be limited to the aspects shown and described previously herein, but should be accorded the full scope consistent with the language of the claims, wherein reference to an element in the singular is not intended to mean "one and only one" unless specifically so stated, but rather "one or more". Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the invention.

What is claimed is:

1. A buried object locator, comprising:
an antenna array;
a moving or rolling element including one or more sondes, with each sonde including a coil wound on a core material;
a circuit coupled to the antenna array for receiving magnetic field signals from a buried object and the one or more sondes; and
a processing element configured to:
determining information about the buried object; and
determine motion, position, or orientation information associated with the locator based at least in part on the received magnetic field signals provided from the sondes.

2. The locator of claim 1, wherein the motion, position, or orientation information includes information associate with a translational movement of the locator relative to a surface.

3. The locator of claim 1, wherein the one or more sondes comprises a plurality of sondes.

4. The locator of claim 3, wherein a first of the plurality of sondes is disposed within a first wheel of the rolling or moving element and a second of the plurality of sondes is disposed within a second wheel of the rolling or moving element.

5. The locator of claim 1, wherein the core material is ferrite.

6. The locator of claim 1, wherein the one or more sondes are disposed within a wheel of the rolling or moving element.

7. A buried object locator, comprising:
an antenna array;
a moving or rolling element including one or more sondes;
a circuit coupled to the antenna array for receiving magnetic field signals from a buried object and the one or more sondes; and
a processing element configured to:
determining information about the buried object; and
determine motion, position, or orientation information associated with the locator based at least in part on the received magnetic field signals provided from the sondes;
wherein the moving or rolling element comprises a wheel assembly and the sondes are disposed on or within one or more of wheels of the wheel assembly.

8. The locator of claim 7, wherein the wheel assembly comprises two wheels.

9. The locator of claim 7, wherein the wheel assembly comprises:
a first outer wheel;
a second outer wheel; and
a center wheel.

10. A buried object locator, comprising:
an antenna array;
a moving or rolling element including one or more sondes;
a circuit coupled to the antenna array for receiving magnetic field signals from a buried object and the one or more sondes;
a processing element configured to:
determine information about the buried object;
determine motion, position, or orientation information associated with the locator based at least in part on the received magnetic field signals provided from the sondes; and
determine one or more characteristics of a ground surface based on the motion, position, or orientation information.

11. The locator of claim 10, wherein the motion, position, or orientation information comprises three-dimensional motion information or three-dimensional position information.

* * * * *